(12) United States Patent
Tawa et al.

(10) Patent No.: US 7,239,599 B2
(45) Date of Patent: Jul. 3, 2007

(54) LIGHT IRRADIATION HEAD AND INFORMATION STORAGE APPARATUS

(75) Inventors: Fumihiro Tawa, Kawasaki (JP); Shinya Hasegawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 339 days.

(21) Appl. No.: 11/057,989

(22) Filed: Feb. 15, 2005

(65) Prior Publication Data

US 2005/0157595 A1 Jul. 21, 2005

Related U.S. Application Data

(63) Continuation of application No. PCT/JP03/04018, filed on Mar. 28, 2003.

(51) Int. Cl.
*G11B 7/00* (2006.01)

(52) U.S. Cl. ............................ 369/112.27; 369/112.28; 369/13.33; 369/13.24

(58) Field of Classification Search .......... 369/112.27, 369/112.28, 13.33, 13.24
See application file for complete search history.

(56) References Cited

U.S. PATENT DOCUMENTS

| | | | | |
|---|---|---|---|---|
| 4,684,206 A | * | 8/1987 | Bednorz et al. | ............ 385/129 |
| 4,725,727 A | * | 2/1988 | Harder et al. | .......... 250/227.28 |
| 5,272,330 A | * | 12/1993 | Betzig et al. | ............... 250/216 |
| 5,294,790 A | * | 3/1994 | Ohta et al. | ................... 250/216 |
| 5,689,480 A | | 11/1997 | Kino | |

FOREIGN PATENT DOCUMENTS

JP           10-206660           8/1998

(Continued)

OTHER PUBLICATIONS

Matsumoto et al.; "Fabrication of a Near-Field Optical Fiber Probe with a Nanometric Metallized Protrusion"; Optical Review, vol. 5, No. 6; pp. 369-373; 1998.

(Continued)

*Primary Examiner*—Andrea Wellington
*Assistant Examiner*—Jorge L. Ortiz-Criado
(74) *Attorney, Agent, or Firm*—Greer, Burns & Crain, Ltd.

(57) ABSTRACT

A light irradiation head of the present invention includes: a propagation body having a tapered two dimensional shape axially symmetrical to a predetermined symmetrical axis, and consisting of a first kind material that propagates electromagnetic fields of light; and a covering body covering the propagation body so as to surround the symmetrical axis, and consisting of a second kind material different from the first kind material. The propagation body further includes: a bottom edge of projecting shape or recessed shape which is present on the symmetrical axis and which is axially symmetrical to the symmetrical axis; a tip edge which is present on the symmetrical axis and which is narrow relative to the bottom edge; and a pair of reflective edges which are present on both sides of the symmetrical axis and whose interval is gradually reduced in the direction from the bottom edge side to the tip edge side.

9 Claims, 21 Drawing Sheets

FOREIGN PATENT DOCUMENTS

| | | |
|---|---|---|
| JP | JP 2000-074812 | 3/2000 |
| | JP 2000-099979 | 4/2000 |
| | JP 2000-221306 | 8/2000 |
| | JP 2000-292338 | 10/2000 |
| | 2001-101698 | 4/2001 |
| JP | 2002-188579 | 7/2002 |
| JP | 2003-030832 | 1/2003 |
| JP | 2003-045004 | 2/2003 |

OTHER PUBLICATIONS

T. Yatsui et al.; "Increasing throughput of a near-field optical fiber probe over 1000 times by the use of a triple-tapered structure"; Applied Physics Letters, vol. 73, No. 15; pp. 2090-2092; Oct. 12, 1998.

* cited by examiner

LIGHT IRRADIATION HEAD AND INFORMATION STORAGE APPARATUS

This is a continuation of International Application No. PCT/JP03/04018 filed on Mar. 28, 2003.

TECHNICAL FIELD

The present invention relates to a light irradiation head that propagates and irradiates light, and to an information storage apparatus utilizing the light irradiation head.

BACKGROUND ART

The amount of information has been increasing with the development of information society. In order to cope with the increase in the amount of information, an information recording method having a drastically high recording density, and a recording and reproducing device based on such recording method are expected.

As a recording method that realizes the high density recording, attention is directed to an optical recording method in which a minute opening smaller than a wavelength of incident light is produced, and the light emitted from the opening is utilized to form a beam spot smaller than the wave length of the light.

As conventional minute opening of the optical recording method, an opening which is provided at the sharpened tip of an optical fiber is known, as described in the Patent Document 1. That is, the optical fiber with the sharpened tip is covered with a metal film, and a part of the covered and sharpened portion is cut by a particle beam such as a focusing ion beam (FIB), for producing an opening.

As another prior art, a method that produces an opening having an inclined face on a planar plate is disclosed in the Patent Document 2. That is, a Si substrate is patterned by photolithography, and the resultant pattern is anisotropic etched to produce a reverse pyramid type recess, and the tip of the reverse pyramid, which is the deepest part of the substrate, is made to penetrate to the back side of the substrate. As the penetration method, a method of polishing the rear surface of the Si substrate and an etching method are known.

A vapor deposition method that deposits a metal on the tip of the sharpened core of an optical fiber that improves the light propagation efficiency is also disclosed in the Non-Patent Document 1.

Alternatively, a shape of an optical fiber that improves both the beam spot size and the propagation efficiency is disclosed in the Non-Patent Document 2.

In an example of the light irradiation head disclosed in the Patent Document 3, there is also disclosed a construction wherein the light irradiation head has a head shape of planer structure produced with a symmetrical two dimensional pattern in which a high refractive index dielectric material in the head is formed to be a trapezoidal shape, so that the spot diameter is reduced by the trapezoidal slope and the planer structure.

(Patent Document 1)
Japanese Patent Laid-Open No. 10-206660
(Patent Document 2)
U.S. Pat. No. 5,689,480
(Patent Document 3)
Japanese Patent Laid-Open No. 2002-188579
(Non-Patent Document 1)
"Optical Review", 1998, Vol 5, No. 6, p 369–373
(Non-Patent Document 2)
"Applied Physics Letters", Vol 73, No. 15

The conventional methods that form a minute opening by sharpening the tip of an optical fiber have problems relating to an unevenly deposited metallic film and to an unstable etching rate caused by the concentration of the etching solution and by the material composition of the optical fiber.

Also, there are problems in the mass production process, such as the instability in producing an optical fiber with a conically sharpened apex angle, and the difficulty of control over cutting off the tip part by means of the FIB. Further, the use of the optical fiber makes it difficult to produce a multiple type head which is a means that enhances a data transfer rate.

The method that etches a semiconductor substrate to form a minute opening has such problems as the varying etching rate relative to the opening size of several tens of nanometers, the varying size of the opening due to an uneven thickness of Si substrate relative to a fixed etching amount, and the varying shape of the etched part due to the deviation in the crystal orientation when the semiconductor substrate is cut out. Also, the reverse pyramid form, which is defined by the crystal orientation unique to the semiconductor substrate, may be unable to be regulated to a desired optimum angle. In addition, there is a problem that many steps of stripping and melting the substrate accelerate consumption of materials, leading to a higher cost.

The track pitch in the high density recording, which is hereafter set to 0.1 micrometers or less, makes it difficult to perform positioning of a light irradiation head and a magnetic sensor head with such an accuracy.

In the prior art intended for enhancing efficiency utilizing an optical fiber, however, the conically shaped tip surrounded by a metal results in a position at which incident light causes an electric field concentration to take place due to the lens effect of the conical surface in the optical fiber.

In the above described Non-Patent Document 2, an open face is arranged at the surface on which the electric fields concentrate, for reducing the beam spot and achieving a high efficiency. Although this method is effective, it requires extremely high machining precision, thereby having a problem associated with processing as in the above described case.

In view of the above problems, in the light irradiation head disclosed in the above described Patent Document 3, the tip of the head is formed to be a two dimensional pattern and a high refraction index material is used as the light propagation material in the head, so as to reduce the light or electric field intensity. However, a simple linear form is used as a form of the joint portion between the head and the waveguide that propagates light from a light source to the head, and consideration for a better form is not made.

DISCLOSURE OF THE INVENTION

The present invention has been made in view of the aforementioned circumstances. An object of the present invention is to provide a light irradiation head having a structure capable of efficiently propagating light from a light source, and an information storage apparatus enabling high density recording using such light irradiation head.

In order to achieve the above object, there is provided a light irradiation head having: a propagation body which has a tapered two dimensional shape axially symmetrical to a predetermined symmetrical axis, and which has a first kind material that propagates electromagnetic fields of light;

a covering body which covers the propagation body so as to surround the symmetrical axis, and which has a second kind material different from the first kind material, the light irradiation head irradiating light propagating in the propagating body, from the tip of the propagating body, the propagation body having: a bottom edge of projecting shape or recessed shape which is present on the symmetrical axis and which is axially symmetrical to the symmetrical axis; a tip edge which is present on the symmetrical axis and which is narrow relative to the bottom edge; and a pair of reflective edges which are present on both sides of the symmetrical axis and of which interval is gradually reduced in the direction from the bottom edge side to the tip edge side.

In this case, the meaning of "irradiating" is not limited to emitting light as a wave, but includes transmitting a vibrating electric field which is referred to as the so-called proximity field light.

Also, the above described propagating body typically has a dielectric transparent to the propagating light, and the above described covering body typically has a metal.

In the light irradiation head according to the invention, since the bottom edge of the propagation body has a projecting shape or a recessed shape axially symmetrical to a symmetrical axis, when light is incident from the bottom edge of the propagation body, the propagation direction of electromagnetic fields of light is changed due to the so-called refraction and diffraction, so as to cause the multiple interference of electromagnetic fields in the propagation body, as a result of which a point with high propagation efficiency of light comes to be present on the symmetrical axis. Providing the tip edge at the position of such point enables the propagation efficiency of the light irradiation head to be improved as compared with the case where a simple linear bottom edge is provided. It is a normal consideration that the propagation efficiency is reduced due to reflection, etc. in the case where such refraction occurs. However, as a result of verification performed by using computer simulation, etc., it is found that a point with higher efficiency is generated rather in the case where such refraction occurs, thereby leading to the present invention.

In the light irradiation head according to the invention, the above described propagation body may preferably have the so-called high refractive index material, such as a diamond and $TiO_2$.

Since the wave length of light is short in the high refractive index material, the peak of the point with high transmission efficiency appears more sharply.

The light irradiation head according to the invention may be a form in which the above described propagation body has a bottom edge formed of a straight line, or in which the above described propagation body has a bottom edge formed of a curved line.

In the case where the bottom edge is formed of a straight line, design and simulation are easily performed to facilitate an improvement for increased performance. On the other hand, since a corner part is more likely to be rounded during manufacture, the bottom edge formed of a curved line can be manufactured more closely to design.

In the light irradiation head according to the invention, the above described propagation body may preferably have a bottom edge greater than the interval between extended lines of the reflective edges, and a propagation auxiliary section that propagates electromagnetic fields between the ends of the bottom edge and the reflective edges.

Although a typical propagation body has a material with high refractive index, electromagnetic fields of light are attenuated extremely in a material with a light refractive index, so that the propagation body of shorter length provides a higher propagation efficiency. In the case of a structure in which the vicinity of the tip edge is configured so as to be simply drawn to the bottom edge side, the bottom edge is made greater than the interval between extended lines of the reflection edges, so that the bottom edge is provided with a propagation auxiliary section so as not to waste light incident on the part protruded from the interval of the extended lines.

The light irradiation head according to the invention is preferably constructed such that the above described propagation body is connected at the bottom edge to the optical waveguide which has a third kind material, different from the above described first kind material, that propagates electromagnetic fields of light, as a result of which light propagating in the optical waveguide can be efficiently irradiated from the tip edge.

In the light irradiation head connected to the optical waveguide in this way, the above described propagation body is preferably connected to the optical waveguide in a state in which the optical axis of the waveguide is in parallel with the above described symmetrical axis, as a result of which the propagation efficiency of the light irradiation head can be further improved.

In the light irradiation head connected to the optical waveguide, the above described propagation body may have a bottom edge longer than the width of the optical waveguide. That is, the light irradiation head, which is even greater than the width of optical waveguide, does not decrease the high propagation efficiency.

There is also provided a preferred structure of the light irradiation head according to the invention, having:

"the above described plural propagation bodies, each consisting of a dielectric material and being arranged in parallel with each other;

plural metallic layers, each being arranged alternately with regard to the plurality of propagation bodies and consisting of a metallic material; and one or more intermediate layers arranged between the propagation body and the metallic layer."

Thus, the structure in which propagation bodies consisting of a dielectric material and metallic layers consisting of a metallic material are laminated, enables electromagnetic fields of light propagating in each propagation body to interfere with each other, as a result of which the spot size of the light eventually irradiated is reduced. Although the structure, in which propagation bodies and metal layers are alternately laminated, is ideally often preferred, a combination of a dielectric material and a metallic material may result in oxidization of the metallic material. Therefore, a structure enabling the intermediate layer to prevent oxidization of the metallic material is preferred. The intermediate layer may have a metallic material which is not oxidized by a dielectric material, or may have an oxide formed of a purposely oxidized metallic material of the metal layer.

In order to achieve the above described object, there is provided an information storage apparatus according to the invention, which irradiates a predetermined information storage medium with light, and which is utilized for at least one of recording and reproducing information, the information storage apparatus having:

a light irradiation head including: a propagation body which has a tapered two dimensional shape axially symmetrical to a predetermined symmetrical axis and which has a first kind material that propagates electromagnetic fields of light; and a covering body which covers the propagation body so as to surround the symmetrical axis and which has a second kind material different from the first kind material, the propagation body further having: a bottom edge of projecting shape or recessed shape which is present on the symmetrical axis and which is axially symmetrical to the symmetrical axis; a tip edge which is narrow relative to the bottom edge; and a pair of reflective edges which are present on both sides of the symmetrical axis and of which interval is gradually reduced in the direction from the bottom edge side to the tip edge side; and an optical waveguide which is connected at the bottom edge to the propagation body of the light irradiation head and which has a third kind material, different from the first kind material, that propagates electromagnetic fields of light.

The information storage apparatus according to the invention, of which basic configuration is only shown here so as to simply avoid a duplication, includes various configurations corresponding to various forms of the above described light irradiation head, in addition to the above described basic configuration.

BEST MODE FOR CARRYING OUT THE INVENTION

Embodiments of the present invention will be explained hereinbelow.

Figure 1:
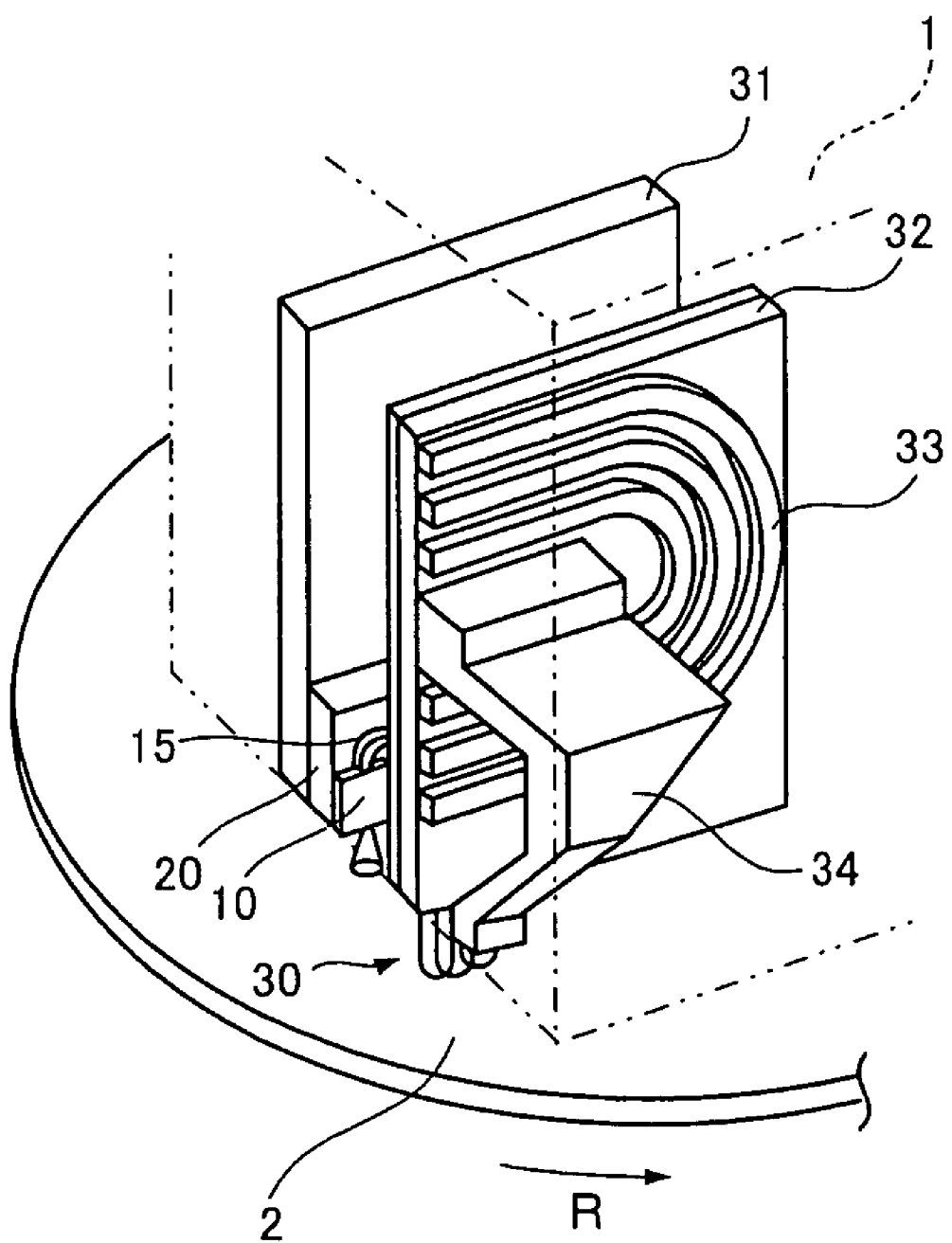
FIG. 1 shows an embodiment of an information storage apparatus according to the invention.

FIG. 1 shows an embodiment of an information storage apparatus according to the invention.

In the figure, there is shown an optical assist information storage apparatus which has a head 1 and an information storage medium 2, and which performs recording and reproducing information to and from the information storage medium 2. However, FIG. 1 shows only the vicinity of the head 1 of the information storage apparatus, and the explanation of the other components, which are equivalent to those of known optical assist information storage apparatus, is omitted.

The head 1 of the information storage apparatus, in which a light irradiation head 10, a reproducing magnetic sensor head 20, and a recording magnetic head 30 are integrally formed by the lithography technology, is positioned adjacent to the information storage medium 2 which rotates in the direction of arrow R.

The light irradiation head 10 and the reproducing magnetic sensor head 20 are formed between an upper magnetic shield 32 which serves as a lower core of the recording magnetic head 30, and a lower magnetic shield 31, while the light irradiation head 10 is connected to an optical waveguide 15 that guides light from a light source. The light irradiation head 10 irradiates light guided by the optical waveguide 15 to the information storage medium 2. In this case, however, the light is not emitted as a wave, but exists as a vibrating electric field in the vicinity of the light irradiation head 10, and the information storage medium 2, when sufficiently approaching the vibrating electric field, enables the vibrating electric field to serve in the same manners as light as a wave.

The recording magnetic head 30 has the upper magnetic shield 32 which serves as the lower core, a coil 33 that generates magnetic field, and an upper core 34, and magnetic fields are generated in a gap between the lower core and the upper core 34.

Rotation of the information storage medium 2 causes a position on the information storage medium 2 at which desired information is recorded or reproduced, to pass through the reproducing magnetic sensor head 20, the light irradiation head 10, and the recording magnetic head 30 in this order. At the time of recording information, a desired position on the information storage medium 2 is heated by optical irradiation through the light irradiation head 10, and magnetic fields are applied by the recording magnetic head 30 immediately after the heating. Thereby, the information recording with a small magnetic field strength can be performed. At the time of reproducing information, the magnetizing direction at a desired position is detected by the reproducing magnetic sensor head 20, so that information is reproduced.

Next, the structure of the light irradiation head 10 is explained in detail.

Figure 2:
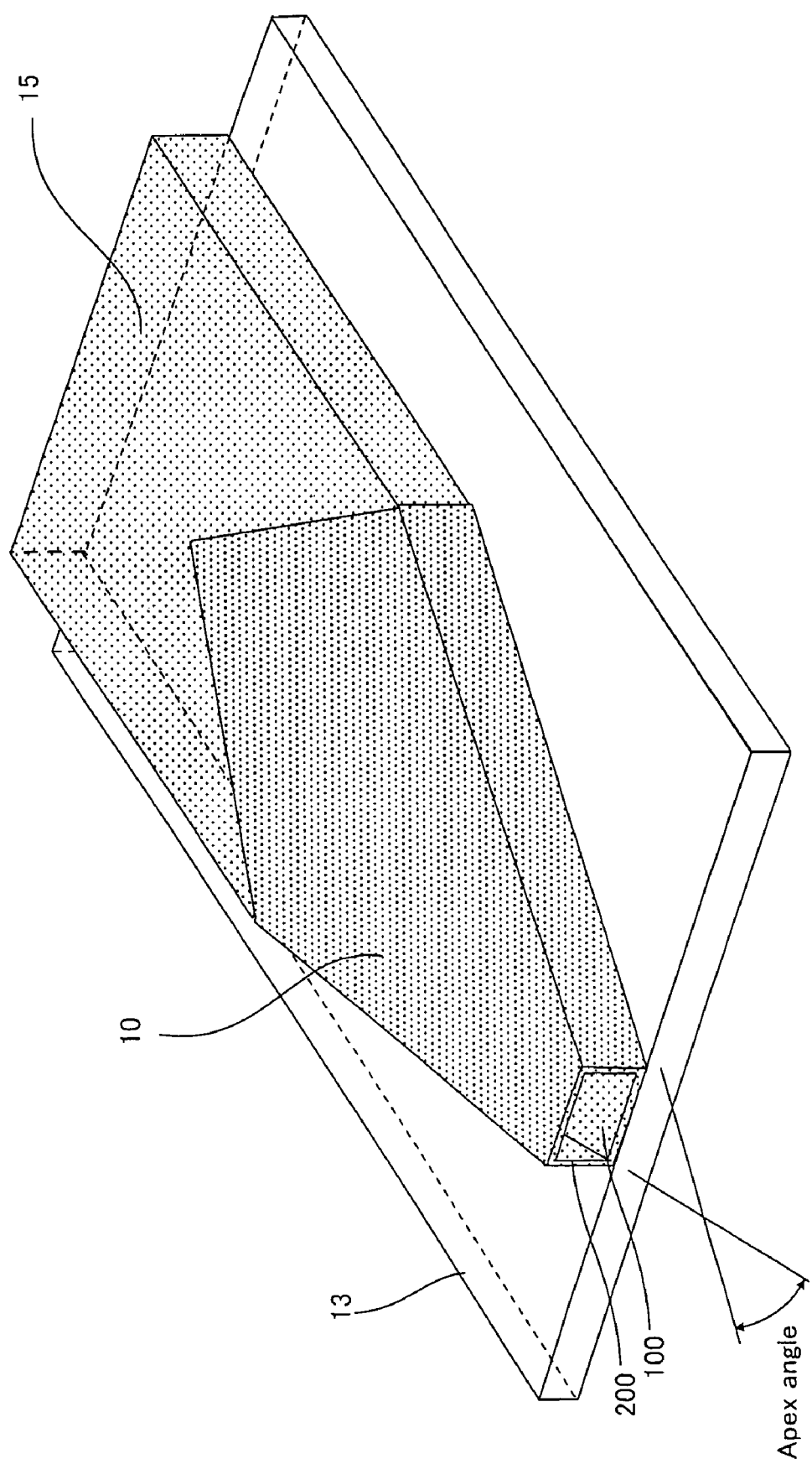
FIG. 2 is a perspective view showing a first embodiment of a light irradiation head according to the invention.

FIG. 2 is a perspective view showing a first embodiment of the light irradiation head according to the invention.

The light irradiation head 10, which is provided on a base plate 13, is connected to the optical waveguide 15, as described above. The optical waveguide 15 is made by using a dielectric material, such as, for example, $SiO_2$ and $MgF_2$, as a core.

The light irradiation head 10 has: a propagation body 100 which has a dielectric having a positive dielectric constant, such as, for example, diamond, $TiO_2$ and ZnS; and a covering body 200 which covers the propagation body 100 and which has a metal, such as, for example, aluminum and silver. The propagation body 100, as a whole, has a tapered two dimensional shape axially symmetrical to a predetermined symmetrical axis, and the dielectric constituting the propagation body 100 is capable of propagating electromagnetic fields of light.

The propagation body 100 corresponds to an example of the propagation body according to the invention, and the dielectric corresponds to an example of the first kind material according to the invention. The covering body 200 corresponds to an example of the covering body according to the invention, and a metal, such as aluminum and silver, corresponds to an example of the second kind material according to the invention.

The light irradiation head 10 transmits with the propagation body 100 electromagnetic fields of light propagated through the optical waveguide 15, so as to irradiate the light from the tip. Since the light irradiation head 10 is of a size of approximately 1 micrometer, electromagnetic fields of light propagate in the propagation body 100 in the form of oscillations of electromagnetic fields rather than light waves, but consideration of a propagation similar to the propagation of waves makes it possible to study the action effect. The exact effect due to the propagation of oscillations of electromagnetic fields can be confirmed by making full use of computer simulation.

Here, a comparison example of the light irradiation head is presented.

Figure 3:
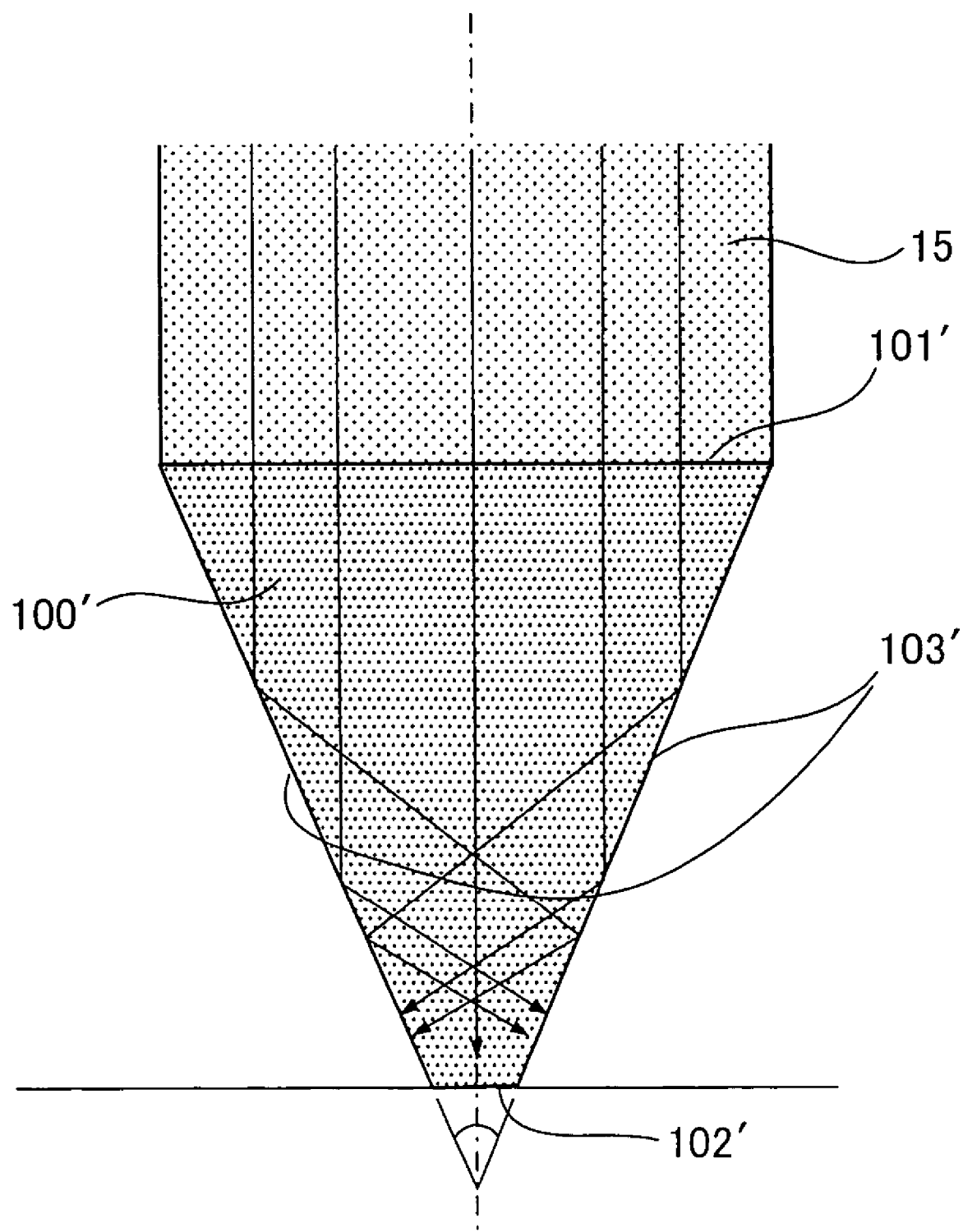
FIG. 3 shows a comparison example of the light irradiation head.
Figure 4:
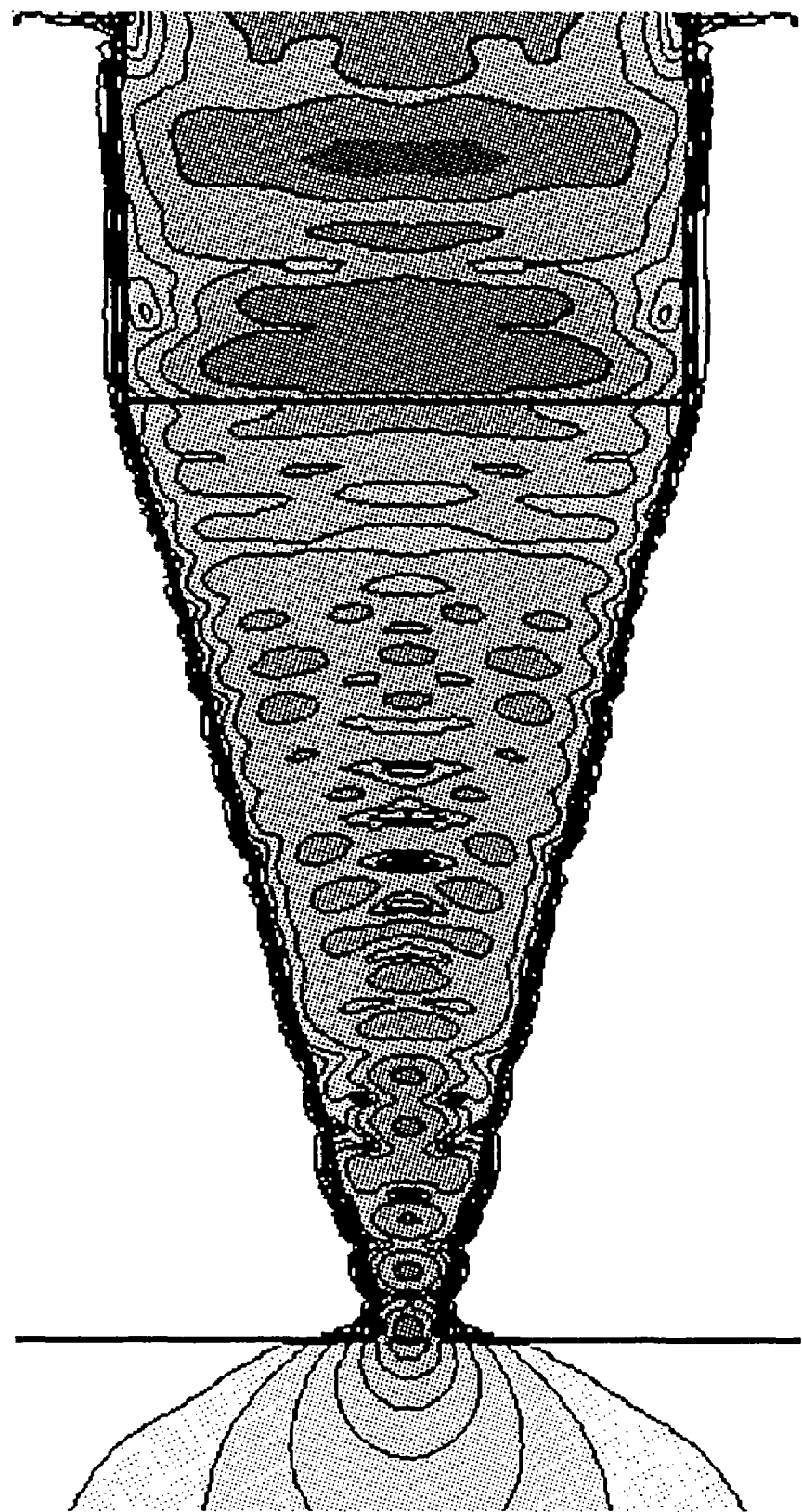
FIG. 4 is a simulation picture showing a propagation state of electromagnetic fields of light in the comparison example of the light irradiation head.

FIG. 3 shows a comparison example of the light irradiation head, and FIG. 4 is a simulation picture showing a propagation state of electromagnetic fields of light in the comparison example of the light irradiation head.

In the figure, the covering body is not shown for convenience of explanation.

The light irradiation head of the comparison example shown in the figure has a propagation body 100' connected to the optical waveguide 15, the propagation body 100' having a linear bottom edge 101', a tip edge 102' which is narrower than the bottom edge 101' and a pair of reflective edges 103' of which interval is gradually reduced in the direction from the bottom edge 101' side to the tip edge 102' side. The propagation body 100' is connected at the bottom edge 101' to the optical waveguide 15.

The electromagnetic fields of light incident from the optical waveguide 15 on the propagation body 100' in the comparison example, is propagated in the propagation body 100' and reflected by the pair of reflective edges 103', so as to interfere with each other. As a result, a spot is generated at the tip edge 102' at which the intensity of electromagnetic fields is increased (see FIG. 4). A profile representing the intensity distribution of electromagnetic fields at such spot is dependent on the inclination (apex angle) of the pair of reflective edges 103', so that the profile of the spot at the tip edge 102' becomes smaller with the reduction in the apex angle. In the light irradiation head, a smaller profile is preferred.

However, the smaller apex angle makes the propagation body 100' longer and also the propagation distance longer. This increases attenuation of electromagnetic fields which is caused by the absorption or a limit due to the wavelength, and reduces the propagation efficiency of electromagnetic fields in propagation body 100'. In the light irradiation head, higher propagation efficiency is preferred.

That is, two kinds of performance evaluations of profile form and of propagation efficiency, tend to be conflicting with each other, so that a compromise between these evaluations is made to determine the apex angle.

Various kinds of embodiments according to the invention in relation to such comparison example are described below.

Figure 5:
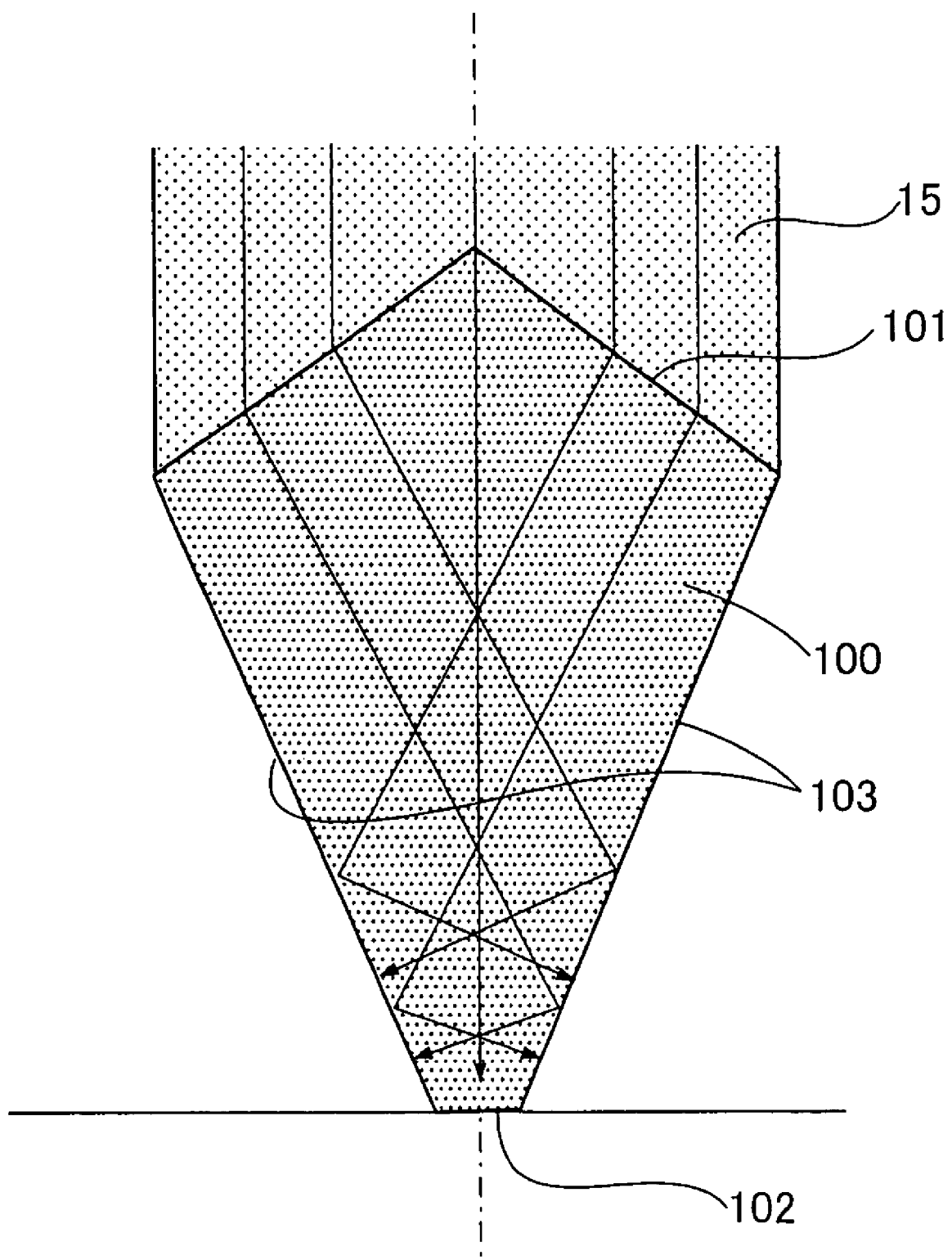
FIG. 5 is a top view showing the first embodiment of the light irradiation head according to the invention.
Figure 6:
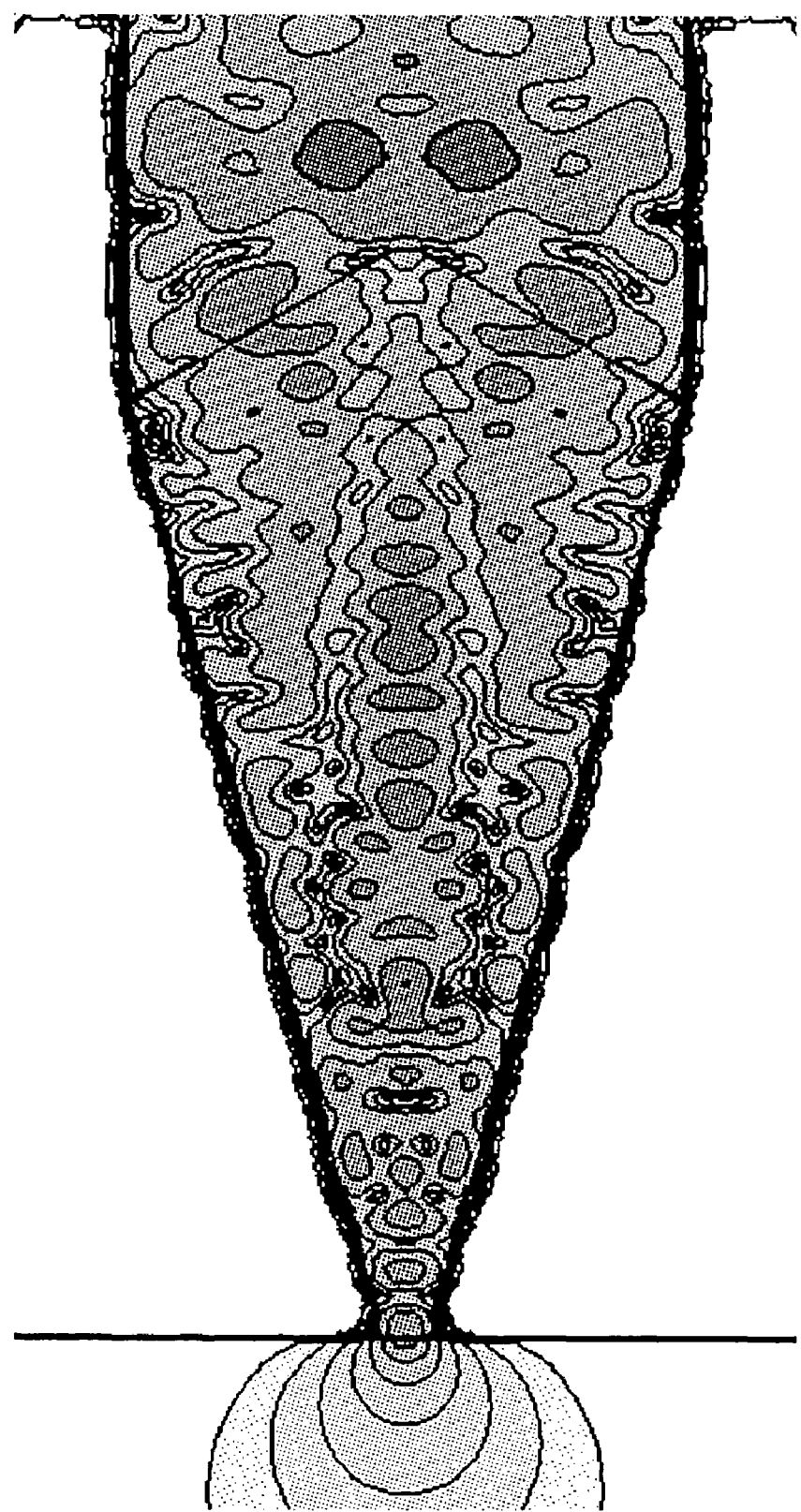
FIG. 6 is a simulation picture showing a propagation state of electromagnetic fields of light in the first embodiment of the light irradiation head according to the invention.

FIG. 5 is a top view showing a first embodiment of the light irradiation head according to the invention, and FIG. 6 is a simulation picture showing a propagation state of electromagnetic fields of light in the first embodiment of the light irradiation head according to the invention.

Similarly, the covering body is omitted here.

The first embodiment has the propagation body 100 as described above, which has a bottom edge 101 of projecting shape axially symmetrical to the symmetrical axis, a tip edge 102 narrower than the bottom edge 101 and a pair of reflective edges 103 of which interval is gradually reduced in the direction from the bottom edge 101 side to the tip edge 102 side. The propagation body 100 is connected at the bottom edge 101 to the optical waveguide 15, and the bottom edge 101 is configured by two linear lines in this embodiment. The propagation body 100 is connected to the optical waveguide 15 in a state in which the optical axis of the optical waveguide 15 and the symmetrical axis are in parallel with each other.

In the first embodiment configured in such a manner, light propagating in the optical waveguide 15, upon incident on the bottom edge 101, is refracted so that the propagation direction of the light is changed, and the light further propagates in the propagation body 100 so as to be reflected by the pair of reflective edges 103, as a result of which a spot is generated at which electromagnetic fields interfere with each other so as to increase their intensities (see FIG. 6). Since the position of the optical interference and the profile form of the spot depend on the direction of refraction at the bottom edge 101 and the direction of reflection at the reflective edges 103, with a certain refraction caused by the projecting shape of the bottom edge 101, the intersection angle of the propagation direction of electromagnetic fields at the time of interference is made large, so as to generate in the propagation body 100 a spot having a propagation efficiency higher than that of the spot generated in the comparison example. The tip edge 102 formed at the position of such spot makes it possible to obtain the light irradiation head with high propagation efficiency. Alternatively, it is also possible to obtain the light irradiation head in which the length of the propagation body 100 is sufficiently reduced, which has a propagation efficiency similar to that of the comparison example, and which has a profile form smaller than that of the comparison example.

In addition, the bottom edge 101, which has a shape axially symmetrical to the symmetrical axis, enables the above described spot more likely to be generated on the symmetrical axis, and designing and manufacturing the light irradiation head to be easily performed.

Figure 7:
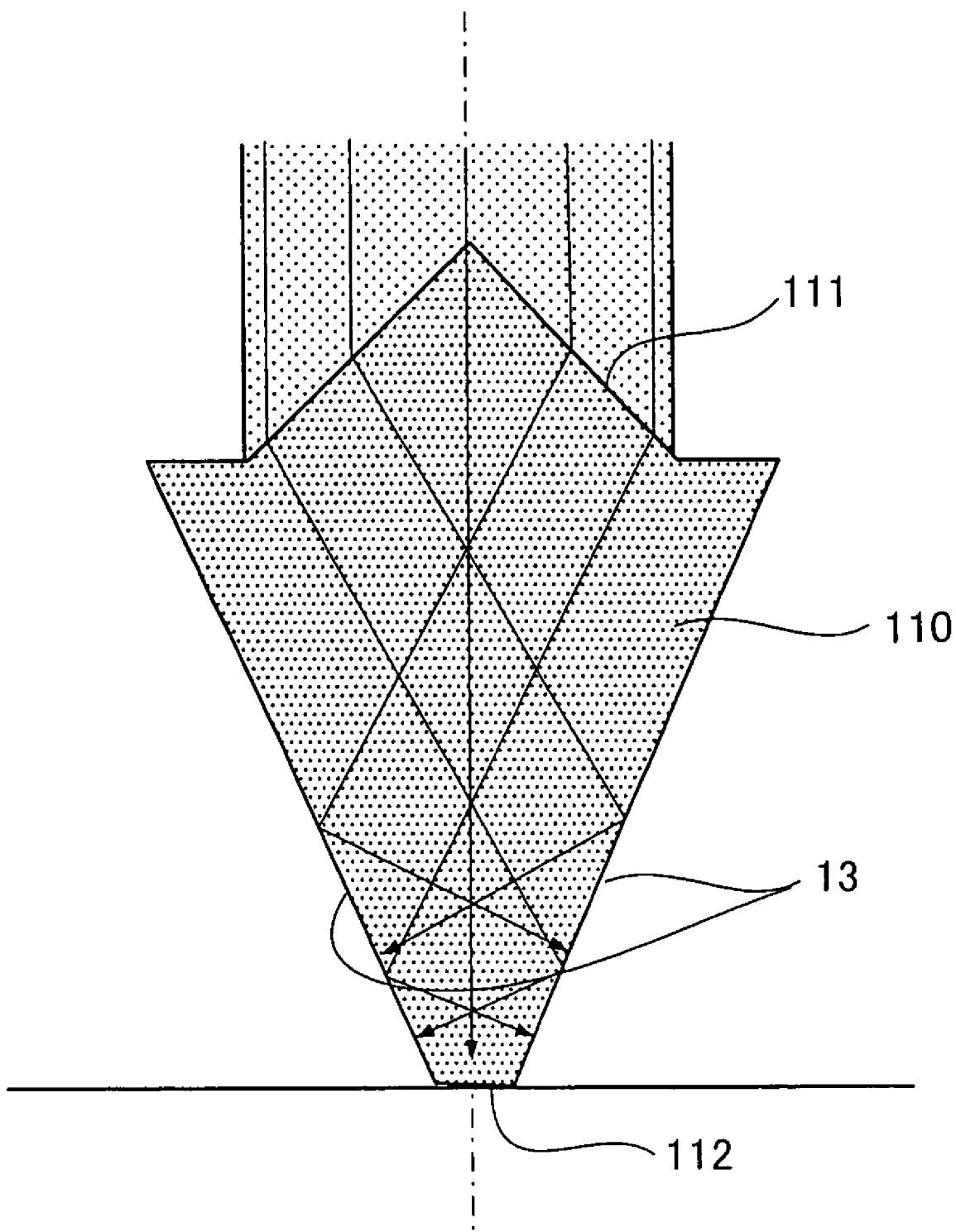
FIG. 7 shows a second embodiment of the light irradiation head according to the invention.
Figure 8:
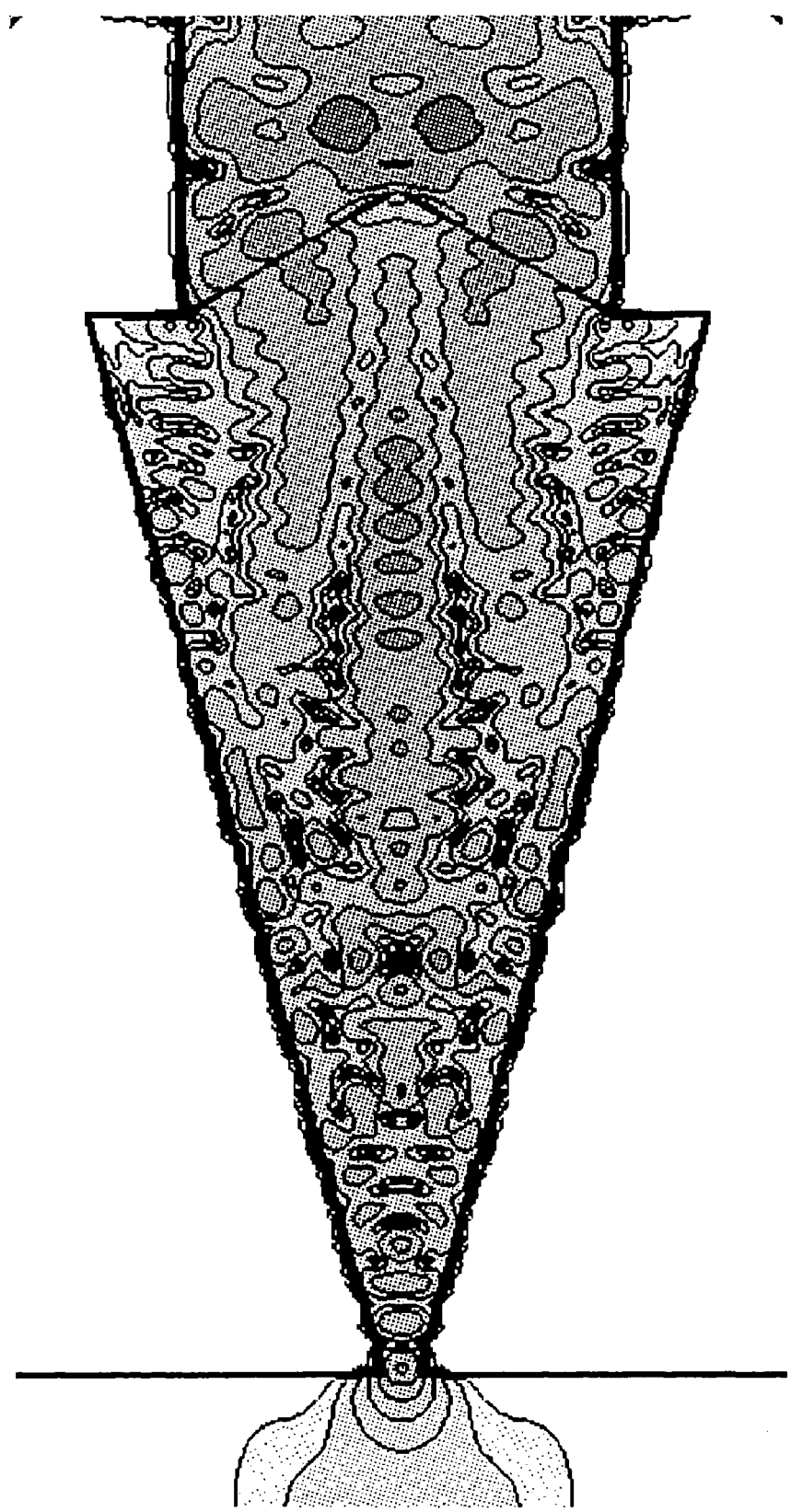
FIG. 8 is a simulation picture showing a propagation state of electromagnetic fields of light in the second embodiment of the light irradiation head according to the invention.

FIG. 7 shows a second embodiment of the light irradiation head according to the invention, and FIG. 8 is a simulation picture showing a propagation state of electromagnetic fields of light in the second embodiment of the light irradiation head according to the invention.

A propagation body 110 in the second embodiment has a bottom edge 111 of projecting shape axially symmetrical to the symmetrical axis, a tip edge 112 narrower than the bottom edge 111, and a pair of reflective edges 113, of which interval is gradually reduced in the direction from the bottom edge 111 side to the tip edge 112 side. The bottom edge 111 is also configured by four straight lines, and the length of the bottom edge 111 of the propagation body 100 is greater than the width of the optical waveguide 15.

In the light irradiation head of such configuration, electromagnetic fields of light which are propagated in the propagation body 110 and irradiated from the tip edge 112, are subjected to a filtering in accordance with the propagation distance, so that the profile form (see FIG. 8) in the second embodiment is smaller than the profile form in the first embodiment.

Figure 9:
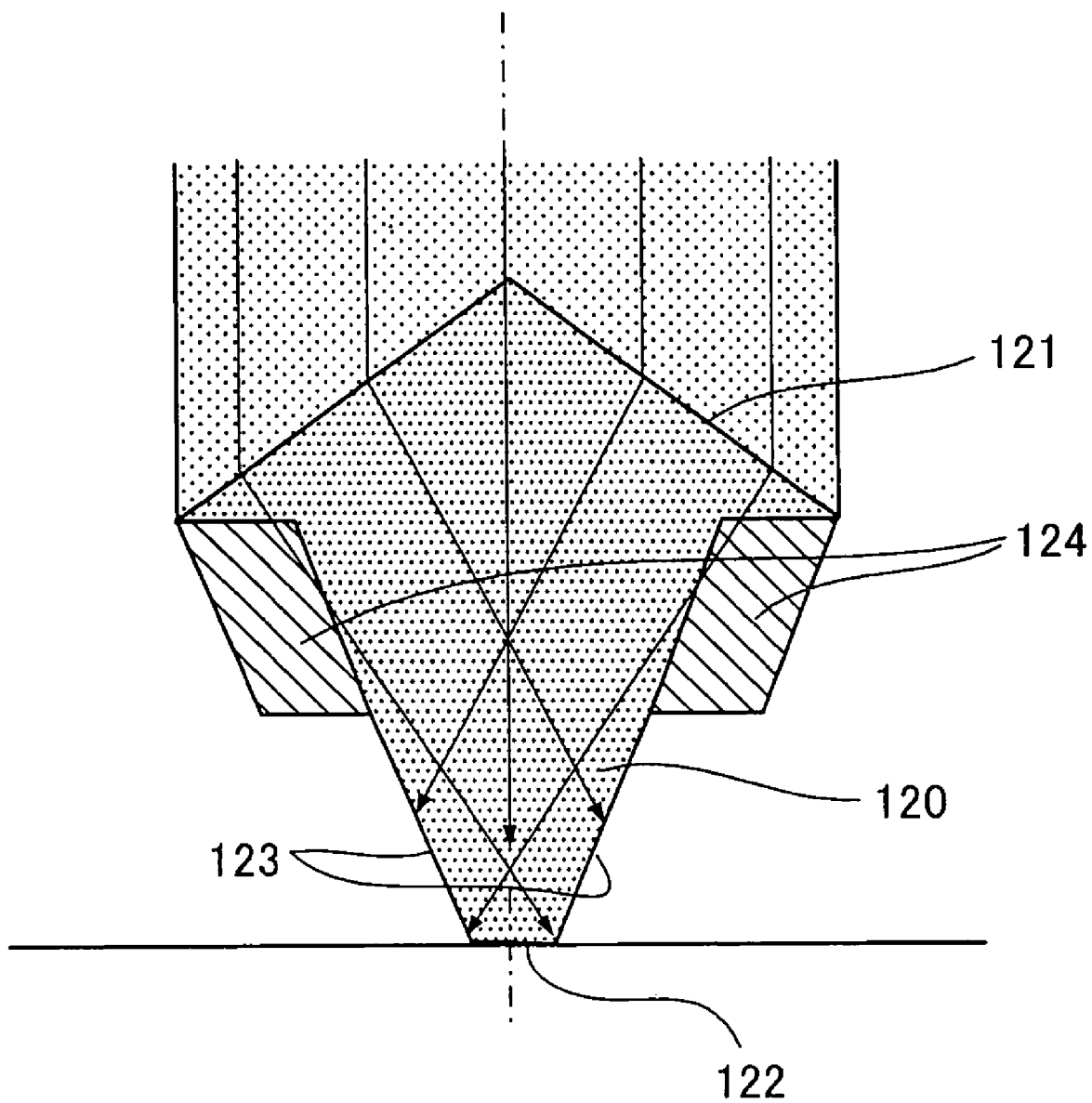
FIG. 9 shows a third embodiment of the light irradiation head according to the invention.
Figure 10:
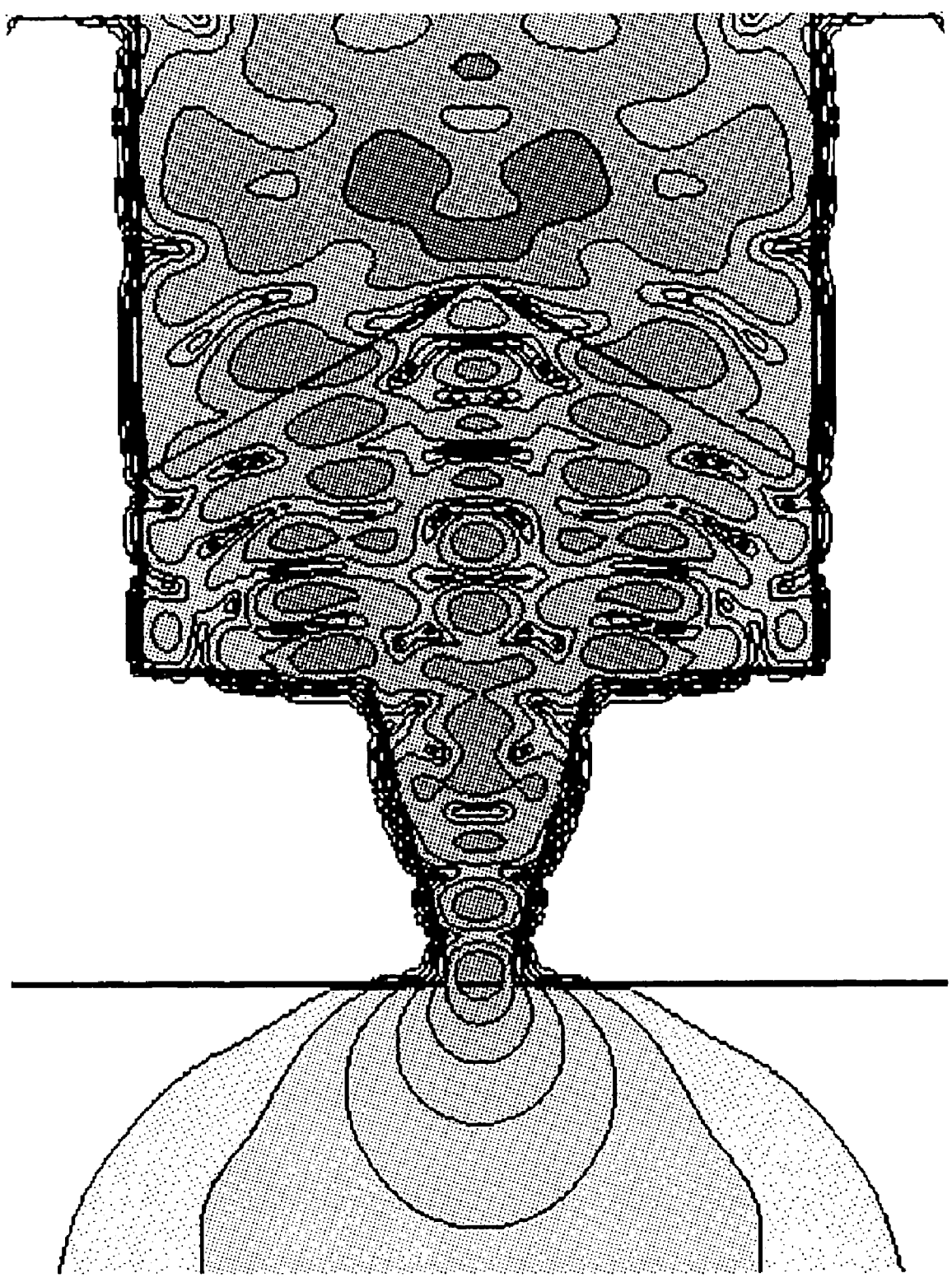
FIG. 10 is a simulation picture showing a propagation state of electromagnetic fields of light in the third embodiment of the light irradiation head according to the invention.

FIG. 9 shows a third embodiment of the light irradiation head according to the invention, and FIG. 10 is a simulation picture showing a propagation state of electromagnetic fields of light in the third embodiment of the light irradiation head according to the invention.

A propagation body 120 in the third embodiment has a bottom edge 121 of projecting shape axially symmetrical to the symmetrical axis, a tip edge 122 narrower than the bottom edge 121, and a pair of reflective edges 123, of which interval is gradually reduced in the direction from the bottom edge 121 side to the tip edge 122 side. The bottom edge 121 is wider than the interval of extended lines of the reflective edges 123, and the propagation body 120 is also provided with a propagation auxiliary section 124 that propagates electromagnetic fields of light between both ends of the bottom edge 121 and the reflective edges 123. In the third embodiment, the bottom edge 121 is also configured by two straight lines.

In the third embodiment, the propagation efficiency is further improved by reducing the propagation distance (see FIG. 10). In addition, the provision of the propagation auxiliary section 124 enables light incident from the vicinity of both ends of the bottom edge 121 to reach between the pair of reflective edges 123, so that waste of light is avoided.

In the third embodiment, an interference pattern of electromagnetic fields similar to that in the first embodiment (see, FIG. 6) can be obtained, so that a profile form of the spot similar to that in the first embodiment can be obtained in the third embodiment.

Although the propagation auxiliary section 124 is angular in the third embodiment, the shape of the propagation auxiliary section described in the invention may be round, as will be described later.

Figure 11:
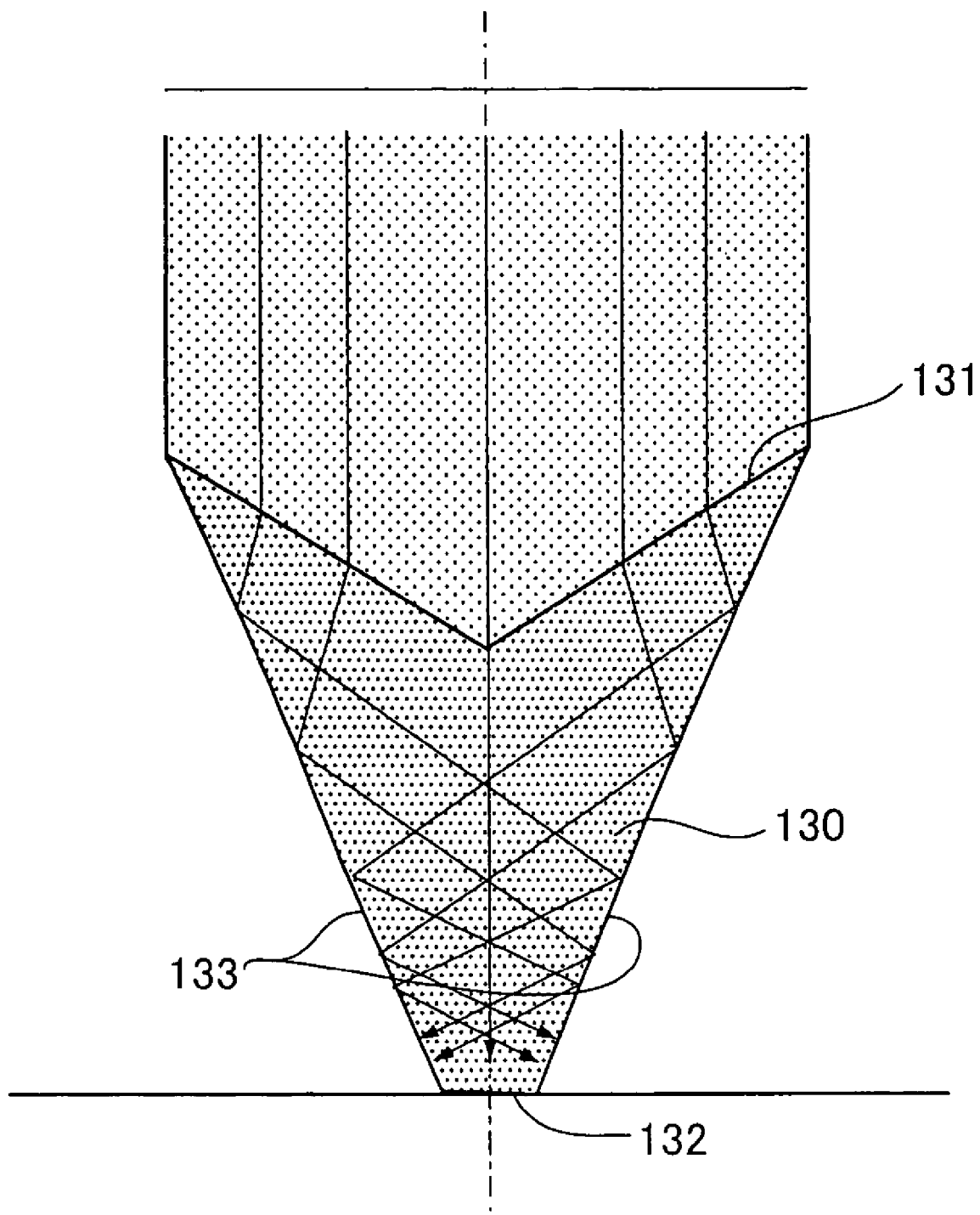
FIG. 11 shows a fourth embodiment of the light irradiation head according to the invention.
Figure 12:
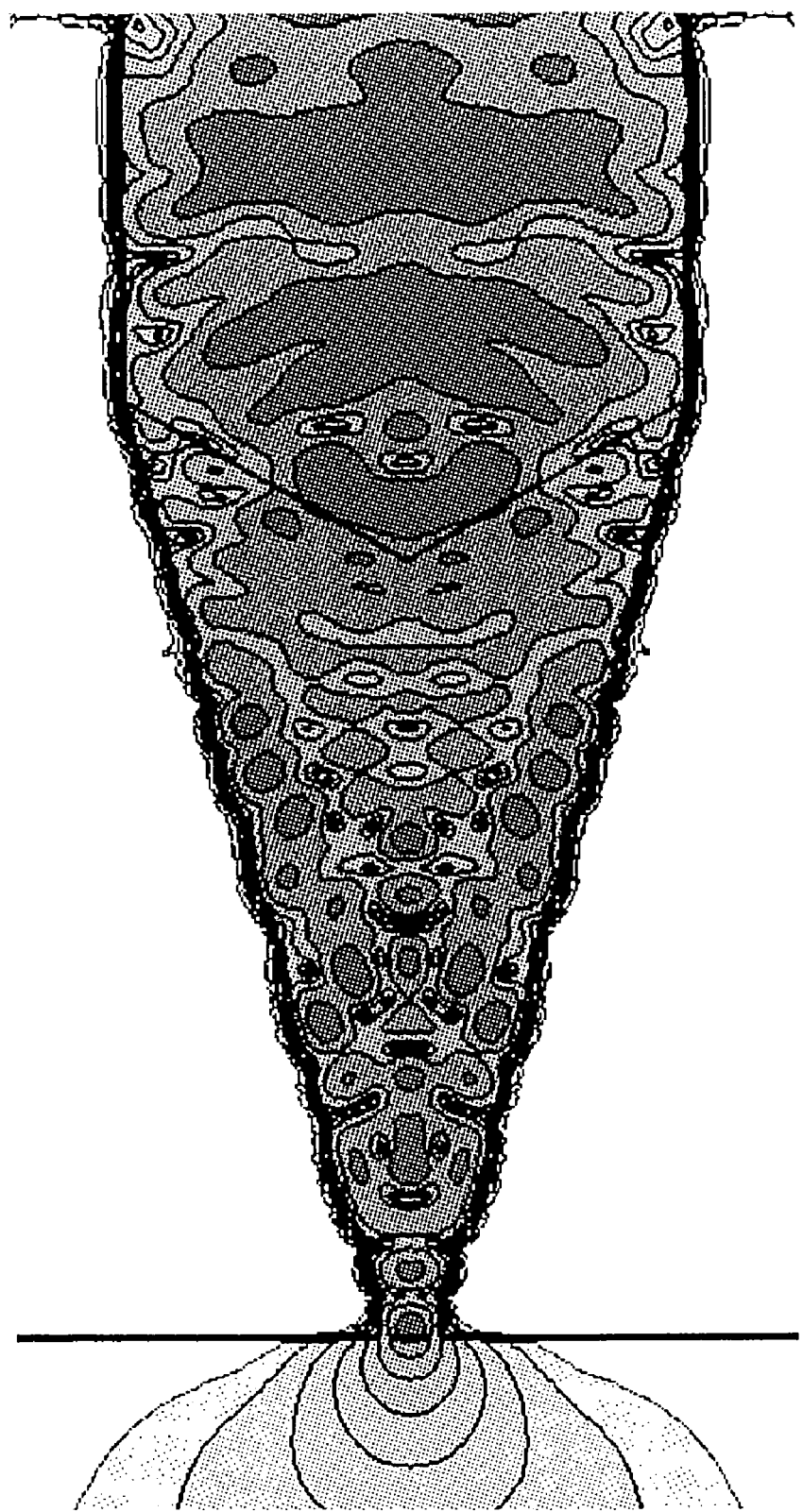
FIG. 12 is a simulation picture showing a propagation state of electromagnetic fields of light in the fourth embodiment of the light irradiation head according to the invention.

FIG. 11 shows a fourth embodiment of the light irradiation head according to the invention, and FIG. 12 is a simulation picture showing a propagation state of electromagnetic fields of light in the fourth embodiment of the light irradiation head according to the invention.

A propagation body 130 in the fourth embodiment, which is formed to be an arrowhead shape as a whole, has a bottom edge 131 axially symmetrical to the symmetrical axis, a tip edge 132 narrower than the bottom edge 131, and a pair of reflective edges 133, of which interval is gradually reduced in the direction from the bottom edge 131 side to the tip edge 132 side. The bottom edge 131 is also configured by two straight lines.

In the fourth embodiment, the propagation body 130, which is provided with the bottom edge 131 of recessed shape, generates a spot with a reduced propagation distance of electromagnetic fields and a high propagation efficiency of the same (see, FIG. 12). The light irradiation head, of which arrowhead shape can be made sufficiently large, is easily manufactured.

Figure 13:
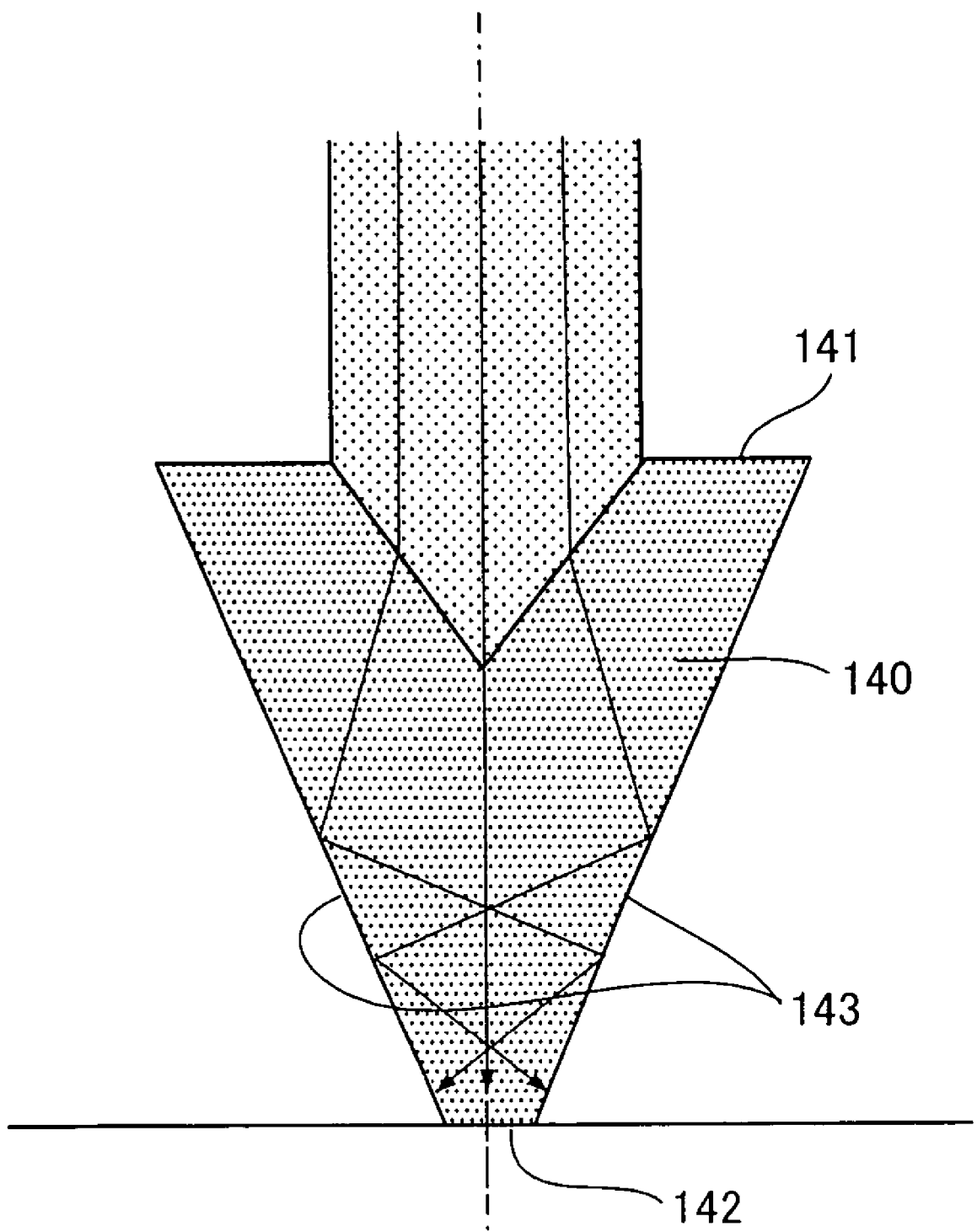
FIG. 13 shows a fifth embodiment of the light irradiation head according to the invention.
Figure 14:
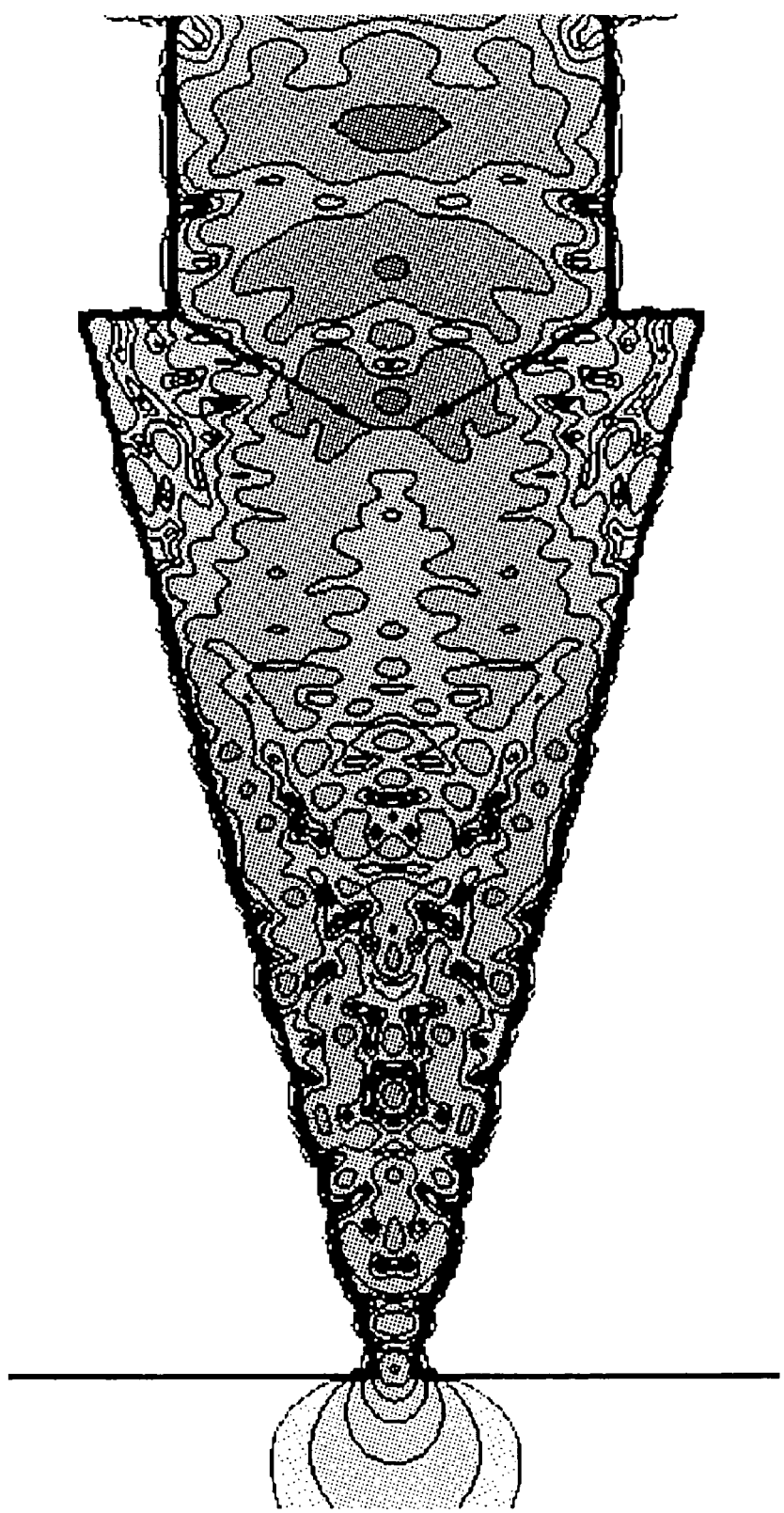
FIG. 14 is a simulation picture showing a propagation state of electromagnetic fields of light in the fifth embodiment of the light irradiation head according to the invention.

FIG. 13 shows a fifth embodiment of the light irradiation head according to the invention, and FIG. 14 is a simulation picture showing a propagation state of electromagnetic fields of light in the fifth embodiment of the light irradiation head according to the invention.

A propagation body 140 in the fifth embodiment has a bottom edge 141 of recessed shape axially symmetrical to the symmetrical axis, a tip edge 142 narrower than the bottom edge 141, and a pair of reflective edges 143, of which interval is gradually reduced in the direction from the bottom edge 141 side to the tip edge 142 side, the bottom edge 141 being configured by four straight lines. The length of the bottom edge 141 is greater than the width of the optical waveguide.

Also in the light irradiation head of the fifth embodiment, electromagnetic fields of light which are propagated in the propagation body 140 and irradiated from the tip edge 142, are subjected to a filtering in accordance with the propagation distance, so that the profile form (see FIG. 14) in the fifth embodiment is smaller than the profile form in the fourth embodiment.

Figure 15:
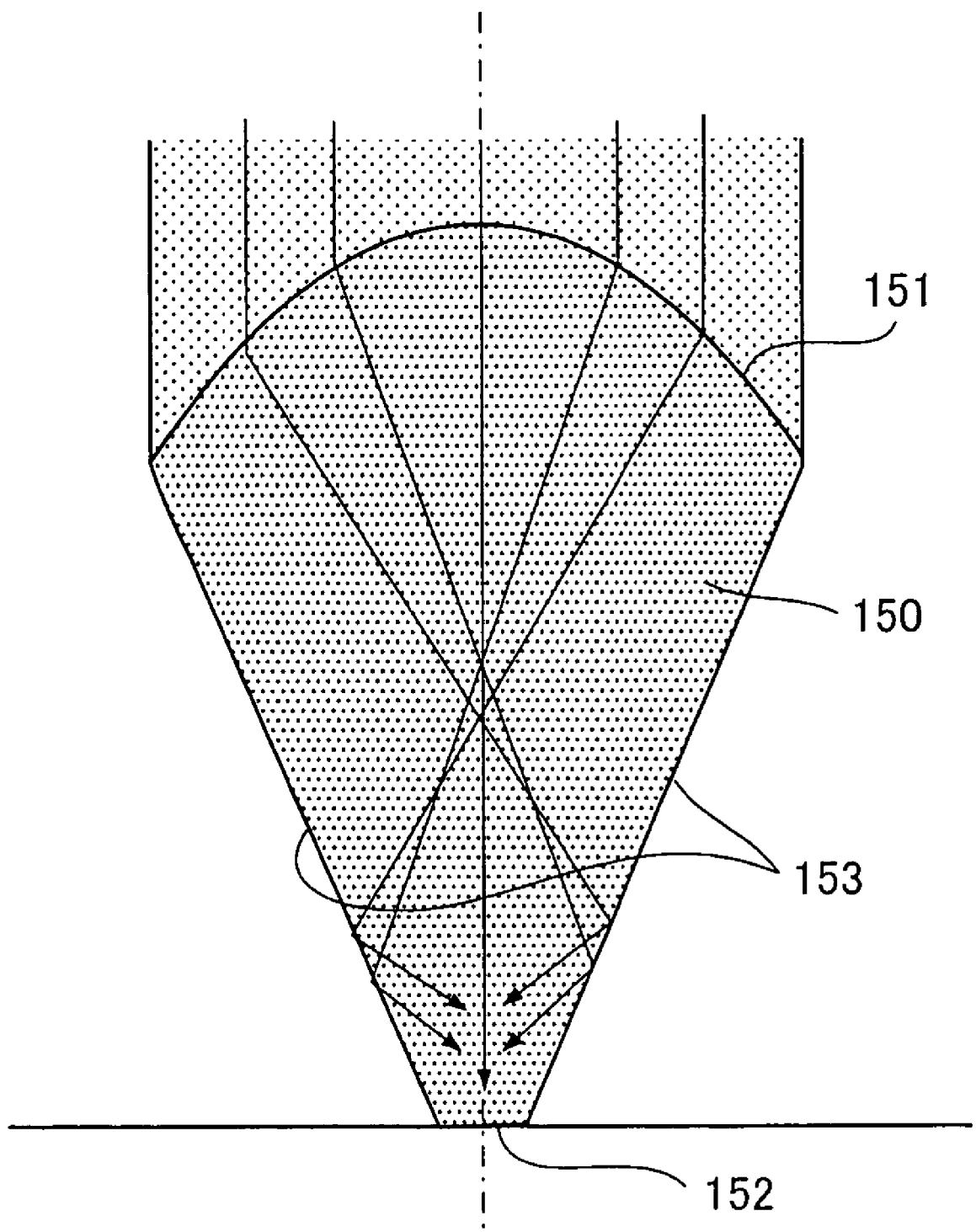
FIG. 15 shows a sixth embodiment of the light irradiation head according to the invention.
Figure 16:
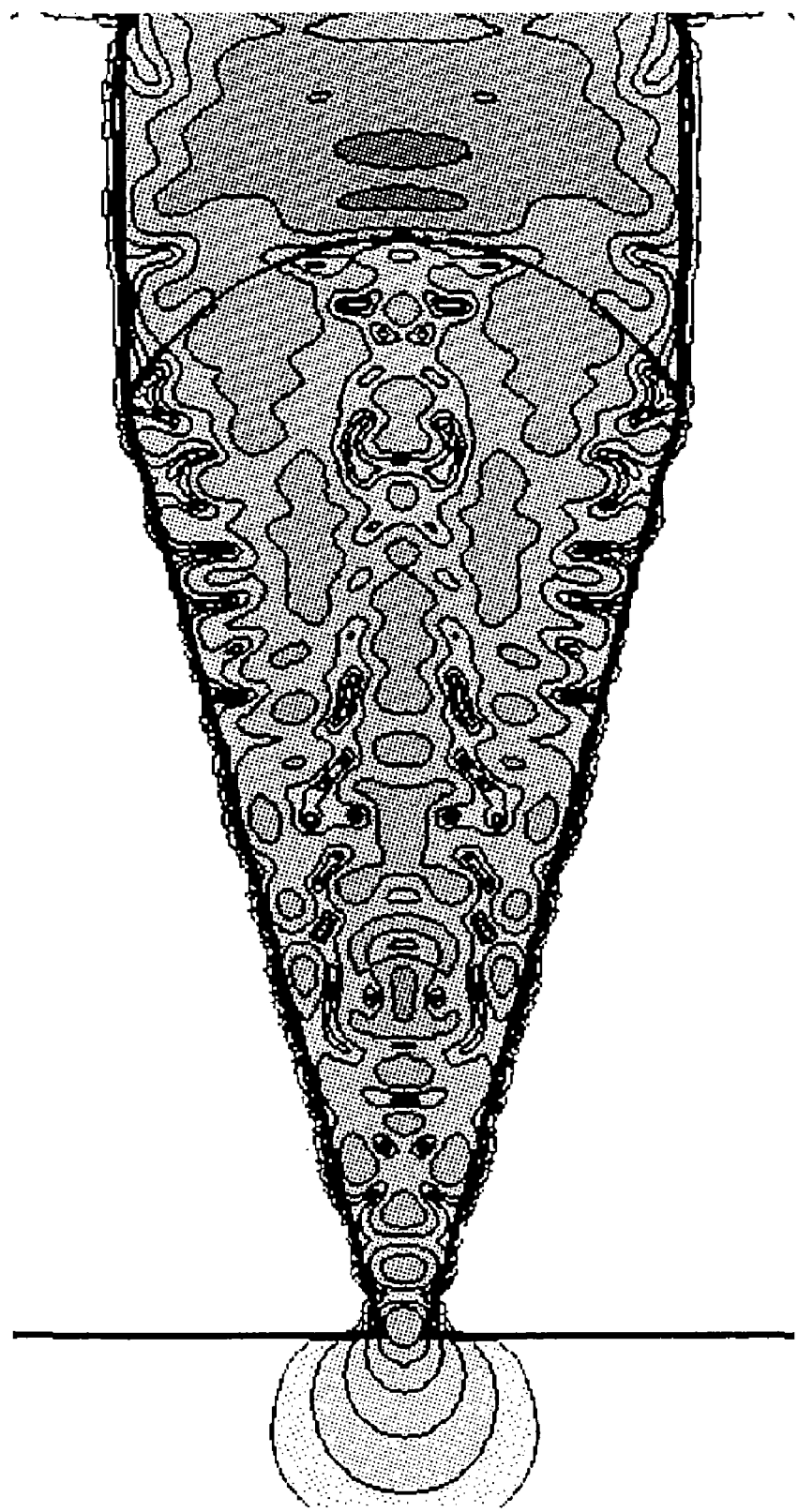
FIG. 16 is a simulation picture showing a propagation state of electromagnetic fields of light in the sixth embodiment of the light irradiation head according to the invention.

FIG. 15 shows a sixth embodiment of the light irradiation head according to the invention, and FIG. 16 is a simulation picture showing a propagation state of electromagnetic fields of light in the sixth embodiment of the light irradiation head according to the invention.

A propagation body 150 in the sixth embodiment has a bottom edge 151 of projecting shape axially symmetrical to the symmetrical axis, a tip edge 152 narrower than the bottom edge 151, and a pair of reflective edges 153, of which interval is gradually reduced in the direction from the bottom edge 151 side to the tip edge 152 side, the bottom edge 151 being configured by a curve like a convex lens. Although the bottom edge 151 is not arranged to collect light at one point, it increases electromagnetic fields which contribute to a profile of light irradiated from the tip edge 152, so that the spot with extremely high propagation efficiency is obtained (see FIG. 16).

Figure 17:
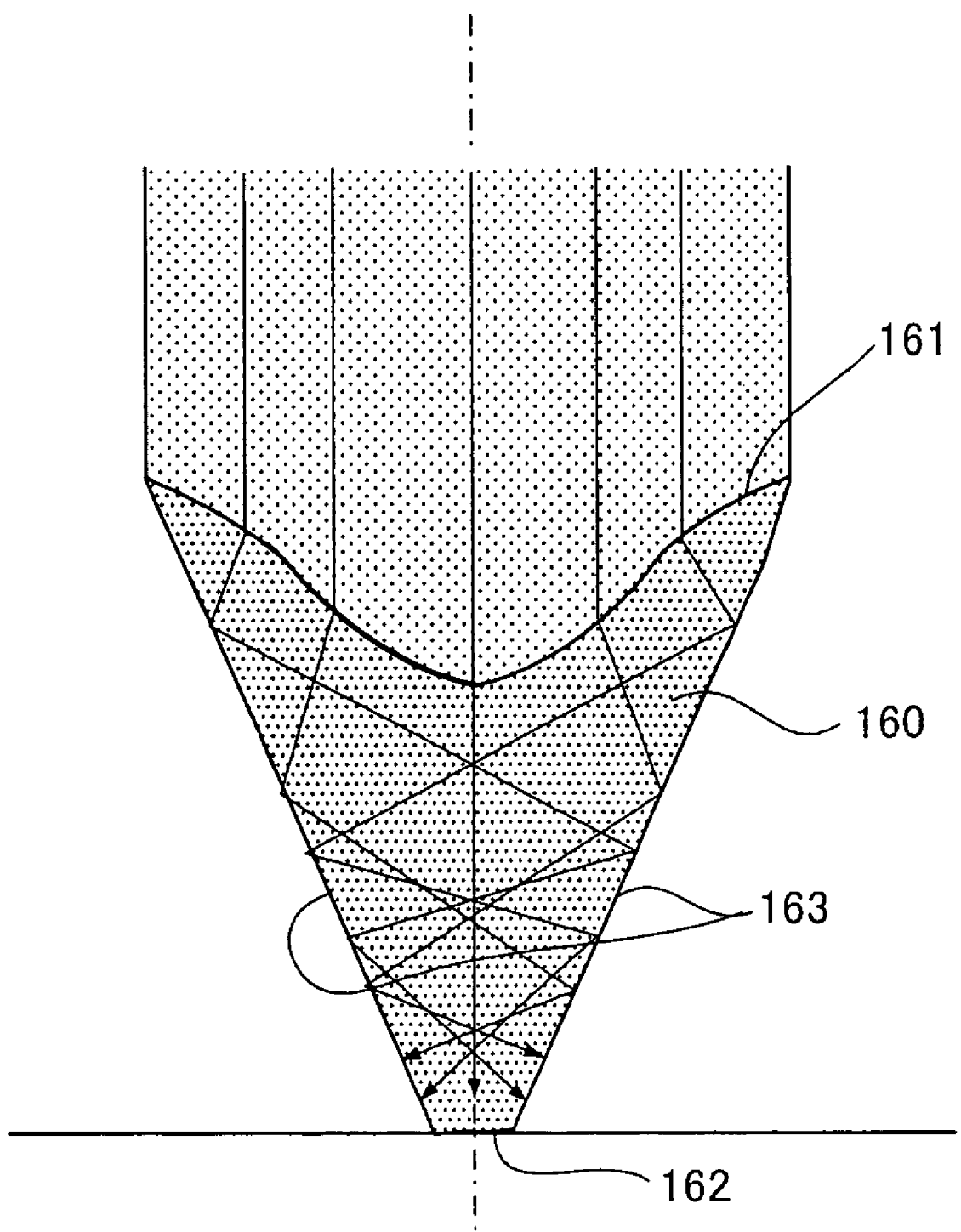
FIG. 17 shows a seventh embodiment of the light irradiation head according to the invention.

FIG. 17 shows a seventh embodiment of the light irradiation head according to the invention.

A propagation body 160 in the seventh embodiment has a bottom edge 161 of recessed shape axially symmetrical to the symmetrical axis, a tip edge 162 narrower than the bottom edge 161, and a pair of reflective edges 163, of which interval is gradually reduced in the direction from the bottom edge 161 side to the tip edge 162 side, the bottom edge 161 being configured by a curve like a concave lens.

In the seventh embodiment, an effect of collecting electromagnetic fields as in the sixth embodiment may not be obtained, but an effect of increasing intersection angle in the direction of propagation at the time of interference of electromagnetic fields is obtained as in the above described embodiments. The effect of reducing the propagation distance and enhancing the propagation efficiency is also obtained.

Figure 18:
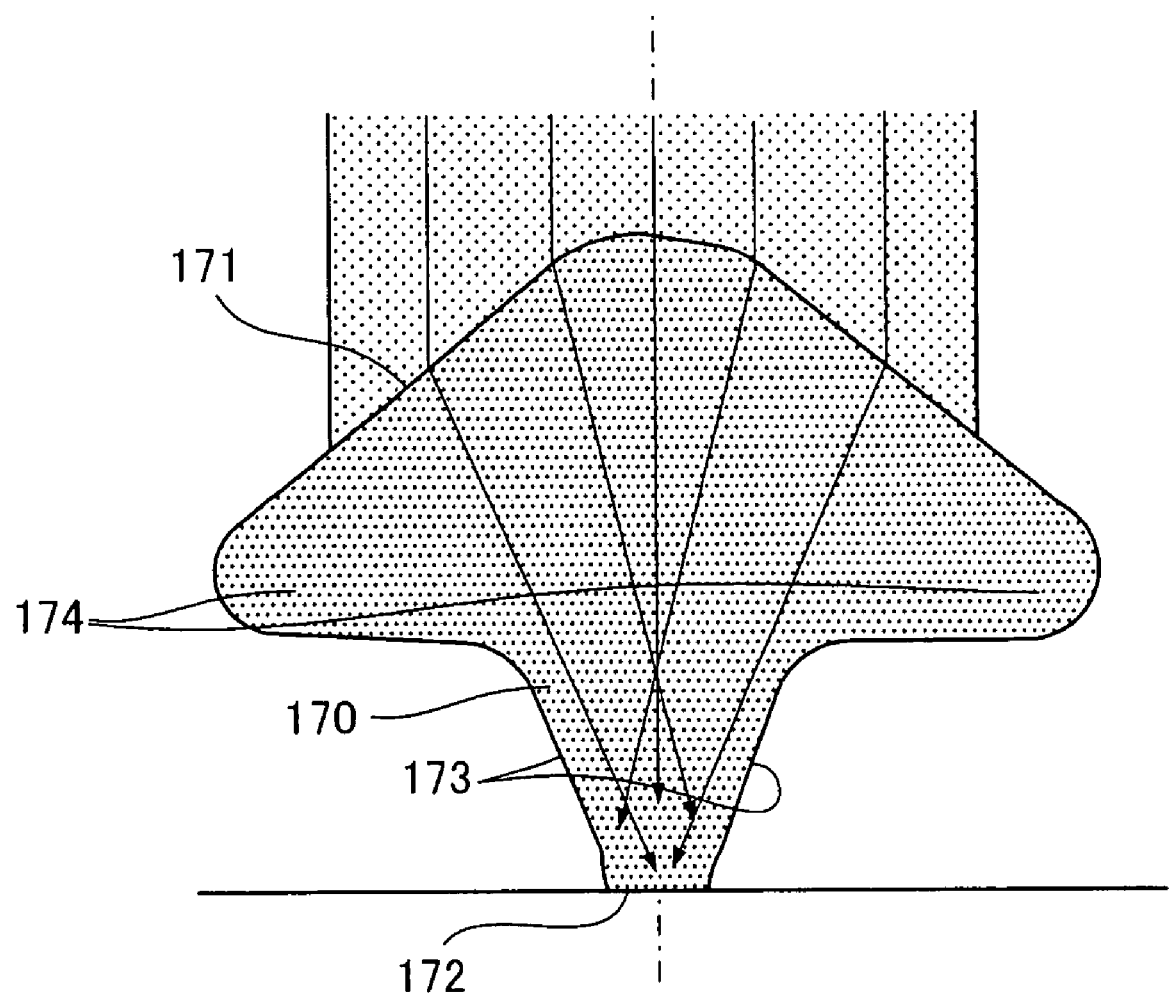
FIG. 18 shows an eighth embodiment of the light irradiation head according to the invention.
Figure 19:
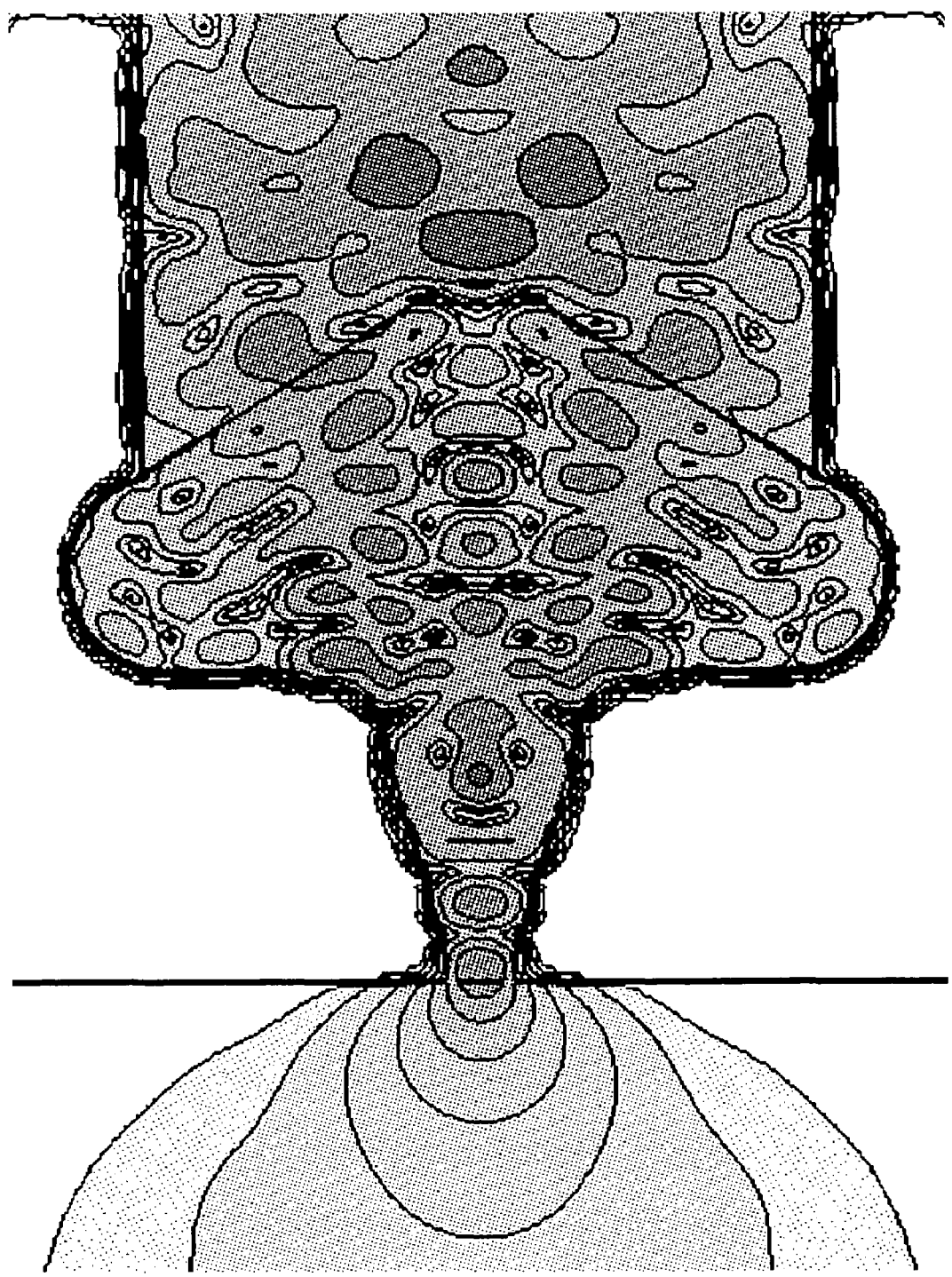
FIG. 19 is a simulation picture showing a propagation state of electromagnetic fields of light in the eighth embodiment of the light irradiation head according to the invention.

FIG. 18 shows an eighth embodiment of the light irradiation head according to the invention, and FIG. 19 is a simulation picture showing a propagation state of electromagnetic fields of light in the eighth embodiment of the light irradiation head according to the invention.

A propagation body 170 in the eighth embodiment has a bottom edge 171 of projecting shape axially symmetrical to the symmetrical axis, a tip edge 172 narrower than the bottom edge 171, and a pair of reflective edges 173, of which interval is gradually reduced in the direction from the bottom edge 171 side to the tip edge 172 side. The bottom edge 171 is wider than the interval of extended lines of the reflective edges 173, and the propagation body 170 is also provided with a propagation auxiliary section 174 that propagates electromagnetic fields of light between the both ends of the bottom edge 171 and the reflective edges 173. In the eighth embodiment, the bottom edge 171 is configured by a combination of curved and straight lines.

The eighth embodiment can be considered to be a curved shape into which the shape of the propagation body 120 in the above described third embodiment is transformed, so that a shape obtained at the time of actually making the propagation body, which is even designed in the shape of the third embodiment to be made, becomes a shape close to the shape of the eighth embodiment. This is because the size of the propagation body is small as a whole and the angles of the propagation body are rounded at the time of manufacture.

In the eighth embodiment, as in the third embodiment, the effect of improving the propagation efficiency by reducing the propagation distance can be obtained (see FIG. 19). Although the propagation auxiliary section 174 in the eighth embodiment is formed in a round shape, the provision of the propagation auxiliary section 174 makes it possible to avoid waste of light, as in the third embodiment.

Figure 20:
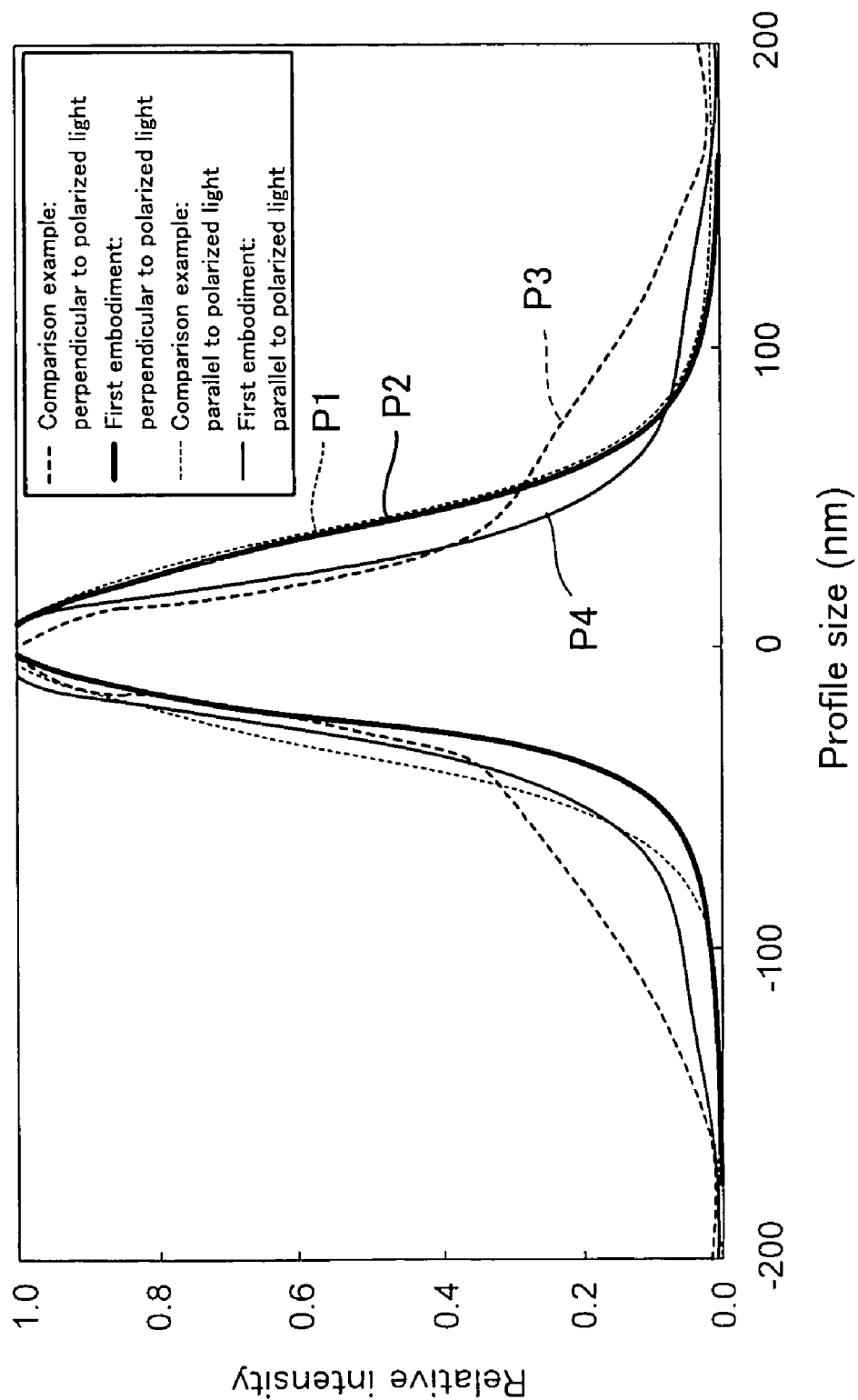
FIG. 20 is a graph showing a comparison between profiles of the irradiation spot in each of the comparison example of the light irradiation head and of the embodiment of the light irradiation head according to the invention.

FIG. 20 is a graph showing a comparison between profiles of the irradiation spot in each of the comparison example of the light irradiation head, and of the first embodiment.

The horizontal axis of the graph shows the profile size and the vertical axis shows the relative electromagnetic field intensity.

In the figure, on condition that light of which wave length is 400 nm is used, that the light irradiation head has: a propagation body having a thickness of 30 nm and consisting of $MgF_2$; and a covering body having a thickness of 20 nm and consisting of aluminum, and that each of the propagation body and the covering body has a common apex angle, for each of the light irradiation head with a shape of the first embodiment shown in FIG. 5 and the light irradiation head with a shape of the comparison example shown in FIG. 3, an intensity distribution (profile) of electromagnetic fields at a position 20 nm distant from the tip edge is calculated and the resultant profiles are compared.

In the four graphic curves P1, P2, P3 and P4 shown in FIG. 20, the graphic curves P1 and P3 illustrated by dotted lines show profiles in the comparison example, and graphic curves P2 and P4 illustrated by solid lines show profiles in the first embodiment. In the four graphic curves P1, P2, P3 and P4, two graphic curves P1 and P2 show profiles in the intra-layer direction of the propagation body, and the other two graphic curves P3 and P4 show profiles in the layer thickness direction of the propagation body.

Since the apex angle is common, the profiles in the intra-layer direction of the propagation body are almost the same in both the comparison example and the first embodiment, with the profile in the first embodiment being somewhat smaller. On the other hand, the profile in the layer thickness direction of the propagation body is substantially improved, in which profile a foot portion (envelope) generated in the comparison example is not seen in the first embodiment.

Figure 21:
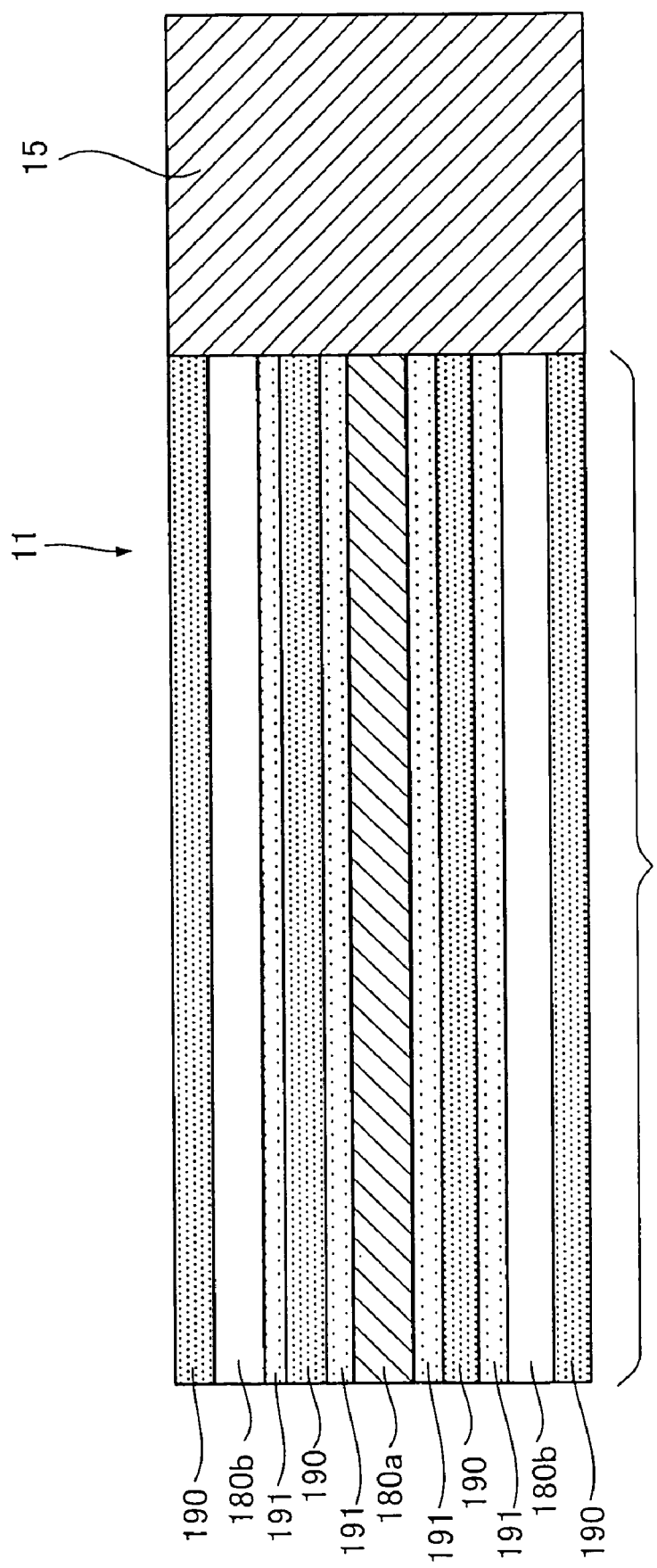
FIG. 21 shows a ninth embodiment of the light irradiation head according to the invention.

FIG. 21 shows a ninth embodiment of the light irradiation head according to the invention.

In the ninth embodiment, a light irradiation head 11 is multilayered, which has a first propagation body 180a consisting of $SiO_2$ and second propagation bodies 180b consisting of $TiO_2$, and which is formed to be a layer structure symmetrical about the first propagation body 180a. The light irradiation head 11 also has aluminum layers 190 which form a part of the covering body and which are alternated with the propagation bodies 180a and 180b. The aluminum layer 190 corresponds to an example of the metallic layer according to the invention. Further, chromium layers 191 are also provided between the first propagation body 180a and the aluminum layer 190 and between the second propagation body 180b and the aluminum layer 190. The chromium layer 191 corresponds to an example of the intermediate layer according to the invention, and the provision of chromium layers 191 is intended for preventing oxidation of the aluminum layer 190, improving the strength of the light irradiation head and preventing wear and breakage of the light irradiation head.

Although the chromium layer 191 is shown as an example of the intermediate layer according to the invention, the intermediate layer may be, for example, an alumina layer obtained by intentionally oxidizing the surface of the aluminum layer 190.

Instead of the aluminum layers 190 described above, layers of an alloy in which aluminum is doped with, for example, manganese, etc. may be provided for the light irradiation head according to the invention. The layers of such an alloy have more excellent corrosion resistance than the aluminum layer 190 described above.

In the light irradiation head according to the invention, the propagation body, of which refractive index is regulated by mixing different dielectric materials, may be used, instead of the above described propagation body consisting of $SiO_2$ and $TiO_2$.

Further, although the optical waveguide having a dielectric core is shown as an example in the above-described embodiments, the optical waveguide of the invention may have a core of air and a vacuum.

In each embodiment described above, the incident angle of light to the light irradiation head according to the invention, is represented by an example in which the light is incident in parallel with lamination planes, the invention is not limited to the parallel incidence, and it goes without saying that the light may be obliquely incident to the lamination planes so as to enable electromagnetic fields of light to propagate more efficiently along the metallic surface.

The metal layers sandwiched between dielectric layers may differ from the metal of the covering body.

The invention claimed is:

1. A light irradiation head comprising:
    a propagation body which has a tapered two dimensional shape axially symmetrical to a predetermined symmetrical axis, and which consists of a first kind material that propagates electromagnetic fields of light; and
    a covering body which covers the propagation body so as to surround the symmetrical axis, and which consists of a second kind material different from the first kind material,
    the light irradiation head irradiating light propagating in the propagating body, from the tip of the propagating body, wherein
    the propagation body comprises:
    a bottom edge of projecting shape or recessed shape which is present on the symmetrical axis and which is axially symmetrical to the symmetrical axis; a tip edge which is present on the symmetrical axis and which is narrow relative to the bottom edge; and a pair of reflective edges which are present on both sides of the symmetrical axis, and of which interval is gradually reduced in the direction from the bottom edge side to the tip edge side.

2. The light irradiation head according to claim 1, wherein the propagation body comprises a bottom edge configured by a straight line.

3. The light irradiation head according to claim 1, wherein the propagation body comprises a bottom edge configured by a curved line.

4. The light irradiation head according to claim 1, wherein the propagation body comprises a bottom edge greater than the interval between extended lines of the reflective edges and a propagation auxiliary section that propagates electromagnetic fields between the ends of the bottom edge and the reflective edges.

5. The light irradiation head according to claim 1, wherein the propagation body is connected at the bottom edge to an optical waveguide consisting of a third kind material which is different from the first kind material and which propagates electromagnetic fields of light.

6. The light irradiation head according to claim 5, wherein the propagation body is connected to the optical waveguide in a state in which the optical axis of the waveguide is in parallel with the symmetrical axis.

7. The light irradiation head according to claim 5, wherein the propagation body comprises a bottom edge longer than the width of the optical waveguide.

8. The light irradiation head according to claim 1, comprising;
a plurality of the propagation bodies, each of which consists of a dielectric material and which are arranged in parallel with each other;
a plurality of metallic layers, each of which consists of a metallic material and which are arranged alternately with regard to the plurality of propagation bodies; and
one or more intermediate layers each of which is arranged so as to be sandwiched between the propagation body and the metallic layer.

9. An information storage apparatus, which irradiates a predetermined information storage medium with light, and which utilizes the irradiated light for at least one of recording and reproducing information, wherein the information storage apparatus comprises:
a light irradiation head including: a propagation body which has a tapered two dimensional shape axially symmetrical to a predetermined symmetrical axis and which consists of a first kind material that propagates electromagnetic fields of light; and a covering body which covers the propagation body so as to surround the symmetrical axis and which consists of a second kind material different from the first kind material, and the propagation body further having: a bottom edge of projecting shape or recessed shape which is present on the symmetrical axis and which is axially symmetrical to the symmetrical axis; a tip edge which is present on the symmetrical axis and which is narrow relative to the bottom edge; and a pair of reflective edges which are present on both sides of the symmetrical axis and of which interval is gradually reduced in the direction from the bottom edge side to the tip edge side; and
an optical waveguide which is connected at the bottom edge to the propagation body of the light irradiation head and which consists of a third kind material, different from the first kind material, that propagates electromagnetic fields of light.

* * * * *